United States Patent
Seo et al.

(10) Patent No.: US 10,164,742 B2
(45) Date of Patent: *Dec. 25, 2018

(54) METHOD AND APPARATUS FOR MAKING HARQS IN CARRIER AGGREGATION SYSTEMS

(71) Applicant: LG ELECTRONICS INC., Seoul (KR)

(72) Inventors: Dongyoun Seo, Anyang-si (KR); Bonghoe Kim, Anyang-si (KR); Joonkui Ahn, Anyang-si (KR); Suckchel Yang, Anyang-si (KR); Hanbyul Seo, Anyang-si (KR); Seungmin Lee, Anyang-si (KR); Yunjung Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/711,213

(22) Filed: Sep. 21, 2017

(65) Prior Publication Data

US 2018/0013523 A1 Jan. 11, 2018

Related U.S. Application Data

(63) Continuation of application No. 15/426,262, filed on Feb. 7, 2017, now Pat. No. 9,794,030, which is a (Continued)

(51) Int. Cl.
*H04L 1/18* (2006.01)
*H04L 5/00* (2006.01)
(Continued)

(52) U.S. Cl.
CPC .......... *H04L 1/1861* (2013.01); *H04L 1/1822* (2013.01); *H04L 1/1854* (2013.01);
(Continued)

(58) Field of Classification Search
None
See application file for complete search history.

(56) References Cited

U.S. PATENT DOCUMENTS

2008/0287068 A1* 11/2008 Etemad ................. H04L 5/0007
455/68
2011/0134774 A1* 6/2011 Pelletier .............. H04W 52/365
370/252

(Continued)

FOREIGN PATENT DOCUMENTS

KR 10-2010-0073998 A 7/2010
KR 10-2011-0073689 A 6/2011
(Continued)

*Primary Examiner* — Christopher M Crutchfield
*Assistant Examiner* — Alan L Lindenbaum
(74) *Attorney, Agent, or Firm* — Birch, Stewart, Kolasch & Birch, LLP

(57) ABSTRACT

A method for performing a hybrid automatic repeat request (HARQ) process, the method performed by a user equipment (UE) and includes receiving data in a first subframe of a secondary cell; and transmitting acknowledgement/negative-acknowledgement (ACK/NACK) information for the data in a second subframe of a primary cell, wherein the primary cell uses a frame comprising at least one downlink subframe and at least one uplink subframe according to an uplink-downlink configuration, wherein the secondary cell uses a frame comprising consecutive downlink subframes, and wherein a maximum number of HARQ processes for the secondary cell is dependent on the uplink-downlink configuration of the primary cell.

8 Claims, 22 Drawing Sheets

Related U.S. Application Data continuation of application No. 14/396,341, filed as application No. PCT/KR2013/003474 on Apr. 23, 2013, now Pat. No. 9,602,253.

(60) Provisional application No. 61/750,316, filed on Jan. 8, 2013, provisional application No. 61/738,401, filed on Dec. 18, 2012, provisional application No. 61/702,214, filed on Sep. 17, 2012, provisional application No. 61/667,947, filed on Jul. 4, 2012, provisional application No. 61/636,740, filed on Apr. 23, 2012.

(51) Int. Cl.
*H04W 72/04* (2009.01)
*H04W 88/02* (2009.01)

(52) U.S. Cl.
CPC .......... *H04L 1/1896* (2013.01); *H04L 5/0055* (2013.01); *H04W 72/042* (2013.01); *H04W 88/02* (2013.01)

(56) References Cited

U.S. PATENT DOCUMENTS

| | | |
|---|---|---|
| 2011/0243088 A1 | 10/2011 | Ahn et al. |
| 2011/0261714 A1 | 10/2011 | Pan et al. |
| 2012/0213170 A1* | 8/2012 | Choi .................... H04L 1/1861 370/329 |
| 2012/0257554 A1 | 10/2012 | Kim et al. |
| 2012/0275397 A1* | 11/2012 | Hsieh ................... H04L 1/1812 370/329 |
| 2013/0070693 A1 | 3/2013 | Kwon et al. |

FOREIGN PATENT DOCUMENTS

| | | |
|---|---|---|
| KR | 10-2011-0082899 A | 7/2011 |
| KR | 10-2011-0088556 A | 8/2011 |
| WO | WO 2011/085159 A2 | 7/2011 |

* cited by examiner

METHOD AND APPARATUS FOR MAKING HARQS IN CARRIER AGGREGATION SYSTEMS

CROSS-REFERENCE TO RELATED APPLICATIONS

This Application is a Continuation of U.S. patent application Ser. No. 15/426,262 filed on Feb. 7, 2017 (now U.S. Pat. No. 9,794,030 issued on Oct. 17, 2017), which is a Continuation of U.S. patent application Ser. No. 14/396,341 filed on Oct. 22, 2014 (now U.S. Pat. No. 9,602,253 issued on Mar. 21, 2017), which is the National Phase of PCT International Application No. PCT/KR2013/003474 filed on Apr. 23, 2013, which claims the benefit under 35 U.S.C. § 119(e) to U.S. Provisional Application Nos. 61/750,316 filed on Jan. 8, 2013, 61/738,401 filed on Dec. 18, 2012, 61/702,214 filed on Sep. 17, 2012, 61/667,947 filed on Jul. 4, 2012 and 61/636,740 filed on Apr. 23, 2012, all of which are hereby expressly incorporated by reference into the present application.

BACKGROUND OF THE INVENTION

Field of the Invention

The present invention relates to wireless communications, and more particularly, to a method and apparatus for performing HARQ in a carrier aggregation system.

Discussion of the Related Art

A carrier aggregation system has recently drawn attention. The carrier aggregation system implies a system that configures a broadband by aggregating one or more component carriers (CCs) having a bandwidth smaller than that of a target broadband when the wireless communication system intends to support the broadband. In the carrier aggregation system, a term, serving cell, is also used instead of the CC. Herein, the serving cell consists of a pair of downlink component carrier (DL CC) and uplink component carrier (UL CC), or consists of only the DL CC. That is, the carrier aggregation system is a system in which a plurality of serving cells is assigned to one user equipment.

Conventionally, in the carrier aggregation system, it is considered to aggregate only CC of the same mode. That is, it is considered to aggregate the CCs that operate in the frequency division duplex (FDD) mode or to aggregate the CCs that operate in the time division duplex (TDD) mode. Particularly, in case of the TDD, it is assumed that the CCs which are aggregated use the same uplink-downlink (UL-DL) configuration. The UL-DL configuration is to notify which one is used either uplink (UL) or downlink (DL) for the respective subframes within the frame that is made up of multiple subframes.

However, in the future wireless communication system, it may not be required to confine the above considerations. For example, the carrier which is comprised of only DL subframes may be aggregated to the carrier that operates as the TDD.

In such a case, the method of performing hybrid automatic repeat request (HARQ) on the premise of aggregating carriers of the same way is required to be changed. That is, the timing between scheduling information and the data scheduled, the timing between acknowledgement/not-acknowledgement (ACK/NACK) for the data, and the like are required to be changed.

SUMMARY OF THE INVENTION

The present invention provides to a method and apparatus for performing HARQ in a carrier aggregation system. Particularly, the present invention provides a method of configuring the timing between scheduling information and the data and the timing between the ACK/NACK and the data and a method of determining the number of maximum HARQ process for that.

In an aspect, a method of performing hybrid automatic repeat request (HARQ) in a carrier aggregation system is provided. The method includes receiving downlink data through a first subframe of a first carrier, transmitting acknowledgement/not-acknowledgement (ACK/NACK) for the downlink data through a second subframe of a second carrier, and receiving the downlink data again through a third subframe of the first carrier, wherein the first carrier is a carrier which s comprised of downlink subframe only, and wherein the second carrier includes the uplink subframe and the downlink subframe.

In another aspect, an apparatus for performing hybrid automatic repeat request (HARQ) in a carrier aggregation system is provided. The apparatus includes a radio frequency (RF) unit that transmits and receives a radio signal, and a processor operating functionally connected with the RF unit, wherein the process is configured to perform, receiving downlink data through a first subframe of a first carrier, transmitting acknowledgement/not-acknowledgement (ACK/NACK) for the downlink data through a second subframe of a second carrier, and receiving the downlink data again through a third subframe of the first carrier, wherein the first carrier is a carrier which s comprised of downlink subframe only, and wherein the second carrier includes the uplink subframe and the downlink subframe.

Even in case of introducing a carrier of new type that does not have backward compatibility with the existing carriers defined in a wireless communication system, it is available to perform the HARQ effectively. In case that the DL only carrier is aggregated as the secondary cell, the present invention provides the method of determining the number of maximum DL HARQ process of the secondary cell, and may perform the HARQ while using resources effectively for that.

DETAILED DESCRIPTION OF THE EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

A communication from the BS to the UE is called a downlink (DL), and a communication from the UE to the BS is called an uplink (UL). A wireless communication system including the BS and the UE may be a time division duplex (TDD) system or a frequency division duplex (FDD) system. The TDD system is a wireless communication system for performing UL and DL transmission/reception by using different times at the same frequency band. The FDD system is a wireless communication system capable of simultaneously performing UL and DL transmission/reception by using different frequency bands. The wireless communication system can perform communication by using a radio frame.

Figure 1:
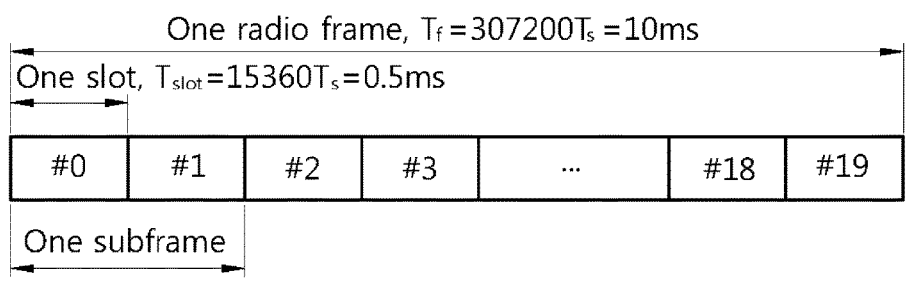
FIG. 1 shows a structure of an FDD radio frame.

FIG. 1 shows a structure of an FDD radio frame.

The FDD radio frame (hereinafter, simply referred to as FDD frame) includes 10 subframes. One subframe includes two consecutive slots. Slots included in the FDD frame are indexed from 0 to 19. The time which is required to transmit one subframe is defined as transmission time interval (TTI) and the TTI may be a minimum scheduling unit. For example, one subframe may have a length of 1 millisecond (ms), and one slot may have a length of 0.5 ms. Assuming that the length of a wireless frame is $T_f$, $T_f$=307200 Ts=10 ms (mili-second).

Figure 2:
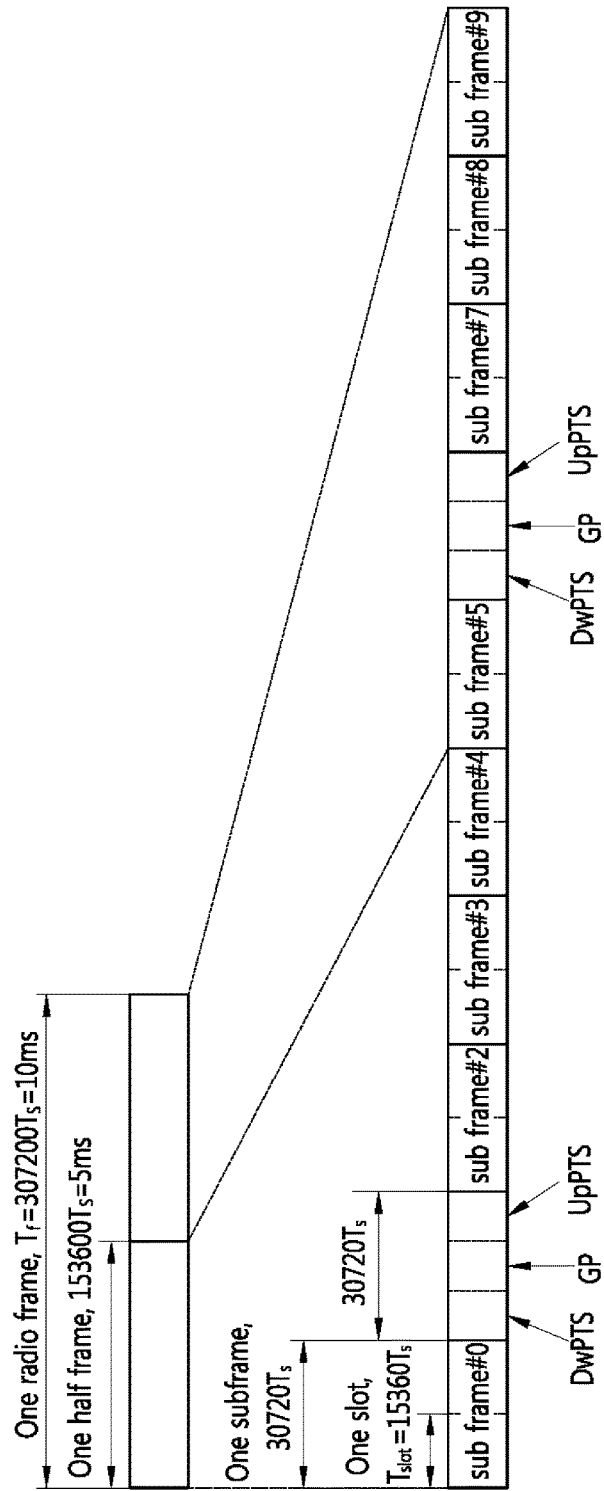
FIG. 2 shows a structure of a TDD radio frame.

FIG. 2 shows a structure of a TDD radio frame.

Referring to FIG. 2, the TDD radio frame (hereinafter, TDD frame) includes 2 half-frames 10 subframes, and 5 subframes are included in a half-frame, consequently the TDD frame includes total 10 subframes. The TDD frame includes an uplink (UL) subframe, a downlink (DL) subframe and a specific subframe (S subframe). When subframes of the TDD frame are indexed starting from 0, a subframe having an index #1 and an index #6 may be a special subframe, and the special subframe includes a downlink pilot time slot (DwPTS), a guard period (GP), and an uplink pilot time slot (UpPTS). The DwPTS is used in a UE for initial cell search, synchronization, or channel estimation. The UpPTS is used in a BS for channel estimation and uplink transmission synchronization of the UE. The GP is a period for removing interference which occurs in an uplink due to a multi-path delay of a downlink signal between uplink and downlink. The GP and the UpPTS take a role of a time gap.

As described above, in the TDD frame, a downlink (DL) subframe and an uplink (UL) subframe coexist. Table 1 below shows an example of a UL-DL configuration of a radio frame.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'DT' represents a DL subframe, 'U' represents a UL subframe, 'S' represents a special subframe. If receiving the UL-DL configuration, the UE may be aware whether each of the subframes in the TDD subframe is a DL subframe (or S subframe) or a UL subframe.

Figure 3:
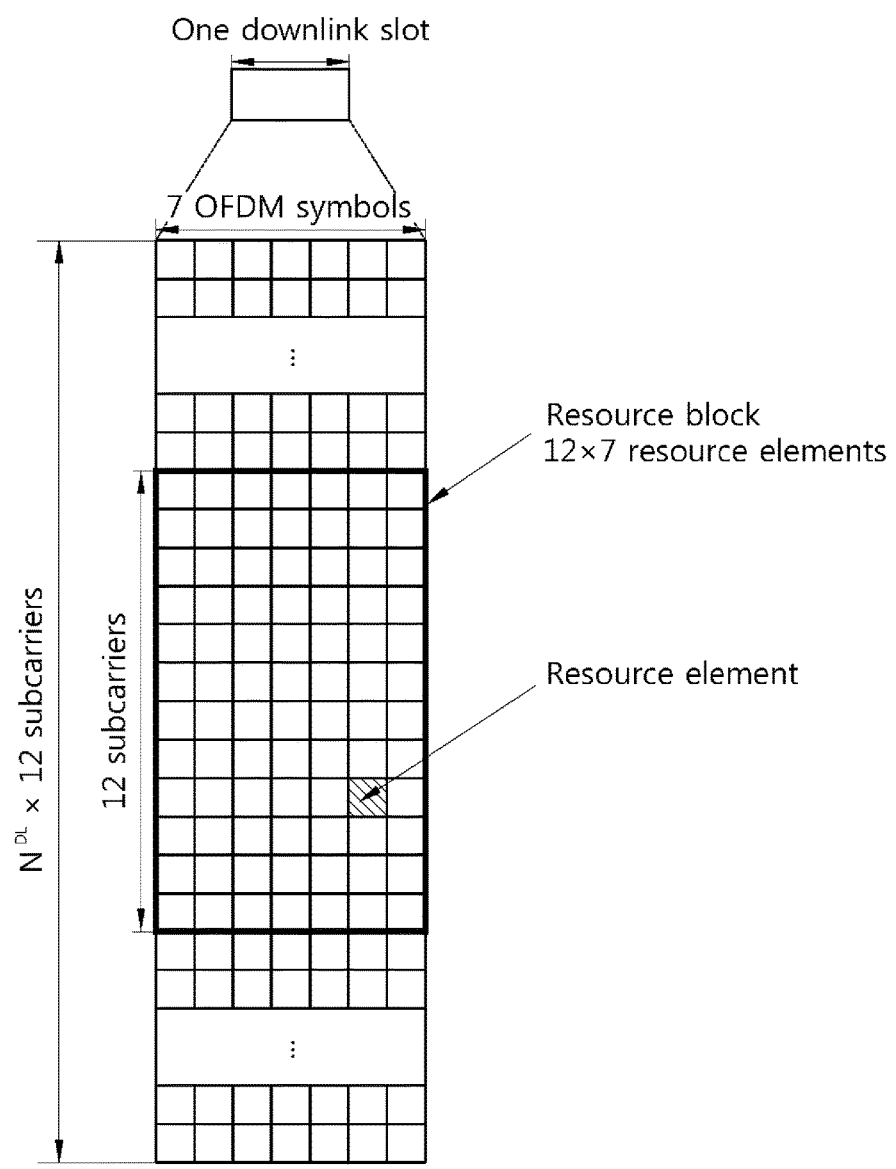
FIG. 3 shows an example of a resource grid for one DL slot.

FIG. 3 shows an example of a resource grid for one DL slot.

Referring to FIG. 3, the DL slot includes a plurality of orthogonal frequency division multiplexing (OFDM) symbols in a time domain, and includes $N_{RB}$ resource blocks (RBs) in a frequency domain. The RB is a resource allocation unit, and includes one slot in the time domain and includes a plurality of sequential subcarriers in the frequency domain. The number $N_{RB}$ of RBs included in the DL slot depends on a DL transmission bandwidth configured in a cell. For example, in the LTE system, $N_{RB}$ may be one in the range of 6 to 110. A structure of a UL slot may be the same as the aforementioned structure of the DL slot.

Each element on the resource grid is referred to as a resource element (RE). The RE on the resource grid can be identified by an index pair (k, l) within the slot. Herein, $k(k=0, \ldots, N_{RB} \times 12-1)$ denotes a subcarrier index in the frequency domain, and $l(l=0, \ldots, 6)$ denotes an OFDM symbol index in the time domain.

Although it is described in FIG. 3 that one resource block includes 7×12 REs consisting of 7 OFDM symbols in the time domain and 12 subcarriers in the frequency domain for example, the number of OFDM symbols and the number of subcarriers in the resource block are not limited thereto. The number of OFDM symbols and the number of subcarriers may change variously depending on a cyclic prefix (CP) length, a frequency spacing, etc. For example, if the CP length corresponds to an extended CP, the resource block includes 6 OFDM symbols. The number of subcarriers in one OFDM symbol may be selected from 128, 256, 512, 1024, 1536, and 2048.

Figure 4:
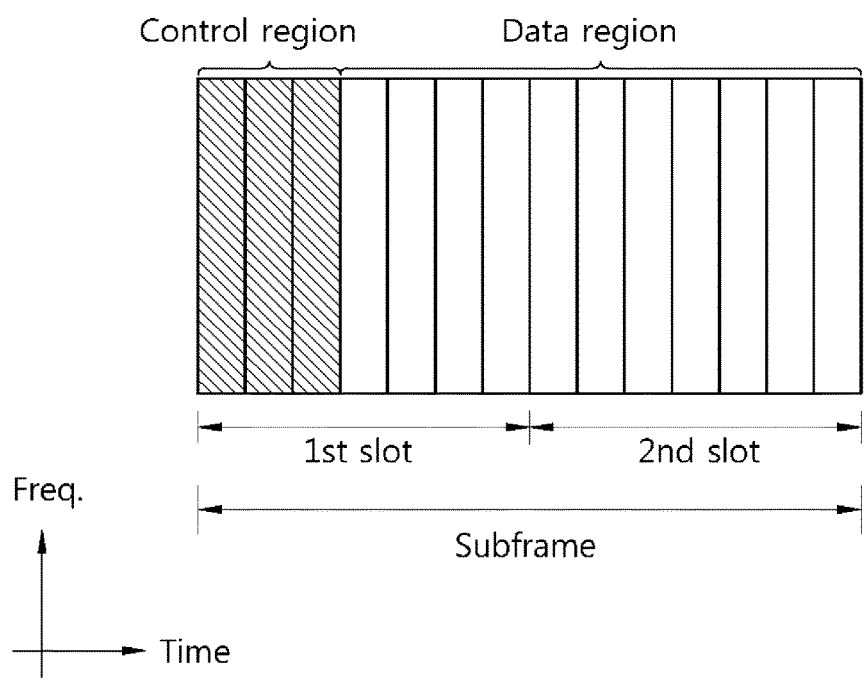
FIG. 4 shows a structure of a DL subframe.

FIG. 4 shows a structure of a DL subframe.

Referring to FIG. 4, the DL subframe is divided into a control region and a data region in the time domain. The control region includes up to three (optionally, up to four) preceding OFDM symbols of a first slot in the subframe. However, the number of OFDM symbols included in the control region may vary. A physical downlink control channel (PDCCH) and another control channel are allocated to the control region, and a physical downlink shared channel (PDSCH), and a physical broadcast channel (PBCH) are allocated to the data region.

A physical control format indicator channel (PCFICH) transmitted in a first OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH. Unlike the PDCCH, the PCFICH does not use blind decoding, and is transmitted by using a fixed PCFICH resource of the subframe.

A physical hybrid-ARQ indicator channel (PHICH) which is transmitted from the control region, and carries a positive-acknowledgement (ACK)/negative-acknowledgement (NACK) signal for an uplink hybrid automatic repeat request (HARQ). The ACK/NACK signal for UL data on a PUSCH transmitted by the UE is transmitted on the PHICH.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The DCI including the DL grant may include the HARQ process number, and include 3 bits for FDD and 4 bits for TDD. A UE may distinguish the HARQ process based on the HARQ process number.

The BS determines a PDCCH format according to DCI to be transmitted to the UE, attaches a cyclic redundancy check (CRC) to the DCI, and masks a unique identifier (referred to as a radio network temporary identifier (RNTI)) to the CRC according to an owner or usage of the PDCCH.

If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC. When the C-RNTI is used, the PDCCH carries control information for a specific UE (such information is called UE-specific control information), and when another RNTI is used, the PDCCH carries common control information received by all or a plurality of UEs in a cell.

The BS encodes the CRC-attached DCI to generate coded data. The encoding includes channel encoding and rate matching. Thereafter, the BS modulates the coded data to generate modulation symbols, and transmits the modulation symbols by mapping the symbols to a physical resource element (RE).

A PDSCH transmitted in the data region is a downlink data channel. System information, data, etc., can be transmitted through the PDSCH. In addition, the PBCH carries system information necessary for communication between the UE and the BS. The system information transmitted through the PBCH is referred to as a master information block (MIB). In comparison thereto, system information transmitted on the PDCCH is referred to as a system information block (SIB).

Figure 5:
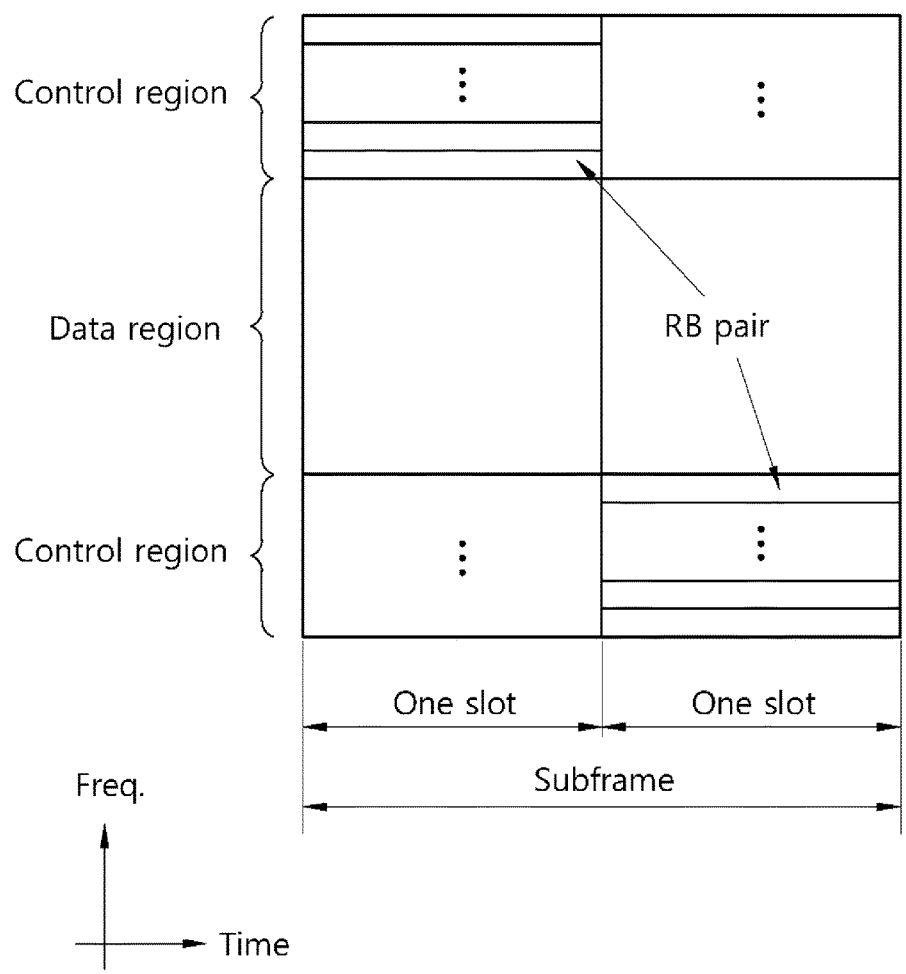
FIG. 5 shows a structure of a UL subframe.

FIG. 5 shows a structure of a UL subframe.

Referring to FIG. 5, the UL subframe can be divided into a control region and a data region. The control region is a region to which a physical uplink control channel (PUCCH) carrying UL control information is allocated. The data region is a region to which a physical uplink shared channel (PUSCH) carrying user data is allocated.

The PUCCH is allocated in an RB pair in a subframe. RBs belonging to the RB pair occupy different subcarriers in each of a first slot and a second slot.

Figure 6:
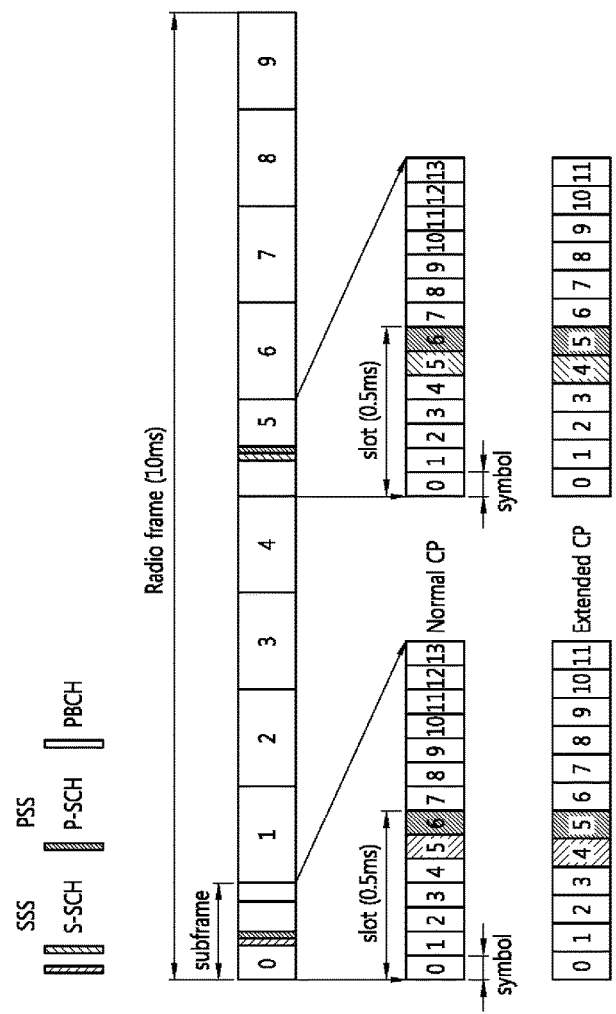
FIG. 6 shows a frame structure for synchronization signal transmission in the conventional FDD frame.

FIG. 6 shows a frame structure for synchronization signal transmission in the conventional FDD frame. A slot number and a subframe number start from 0.

Herein, a synchronization signal is a signal used when a cell search is performed, and includes a primary synchronization signal (PSS) and a secondary synchronization signal (SSS).

The synchronization signal can be transmitted in each of subframes #0 and #5 by considering a global system for mobile communication (GSM) frame length of 4.6 ms to facilitate inter-RAT measurement. A boundary for the frame can be detected through the SSS. More specifically, in the FDD system, the PSS is transmitted in a last OFDM symbol of $0^{th}$ and $10^{th}$ slots, and the SSS is transmitted in an immediately previous OFDM symbol of the PSS. The synchronization signal can transmit 504 physical cell IDs by combining 3 PSSs and 168 SSSs. A physical broadcast channel (PBCH) is transmitted in first 4 OFDM symbols of a first slot. The synchronization signal and the PBCH are transmitted within 6 RBs in a system bandwidth, so as to be detected or decoded by a UE irrespective of a transmission bandwidth. A physical channel for transmitting the PSS is called a P-SCH, and a physical channel for transmitting the SSS is called an S-SCH.

A transmit diversity scheme of the synchronization signal uses only a single antenna port, and is not separately defined in the standard. That is, single antenna transmission or UE-transparent transmission (e.g., precoding vector switching (PVS), time switched transmit diversity (TSTD), cyclic delay diversity (CDD)) can be used.

For the PSS, a length-63 Zadoff-Chu (ZC) sequence is defined in a frequency domain and is used as a sequence of the PSS. The ZC sequence is defined by Equation 1. A sequence element corresponding to a DC subcarrier, i.e., n=31, is punctured. In Equation 1, Nzc=63.

$$d_u(n) = e^{-j\frac{\pi u n(n+1)}{N_{ZC}}} \quad \text{[Equation 1]}$$

Among 6 RBs (i.e., 72 subcarriers), 9 (=72−63) remaining subcarriers are always transmitted with a value of '0', which facilitates a filter design for performing synchronization. To define 3 PSSs, u=25, 29, and 34 are used in Equation 1. In this case, since 29 and 34 have a conjugate symmetry relation, two correlations can be simultaneously performed. Herein, the conjugate symmetry implies the relation of Equation 2 below, and by using this characteristic, a one-shot correlator can be implemented for u=29, 34, and an overall computation amount can be decreased by about 33.3%.

[Equation 2]

$d_u(n) = (-1)^n (d_{N_{ZC}-u}(n))^*$, when $N_{ZC}$ is even number.

$d_u(n) = (d_{N_{ZC}-u}(n))^*$, when $N_{ZC}$ is odd number.

A sequence used for the SSS is used by interleaving two m-sequences having a length of 31. The SSS can transmit 168 cell group IDs by combining two sequences. An m-sequence used as a sequence of the SSS is robust to a frequency selective environment, and can decrease a computation amount according to a fast m-sequence transform using a fast Hadamard transform. In addition, it is proposed to configure the SSS by using two short codes in order to decrease a computation amount of the UE.

Figure 7:
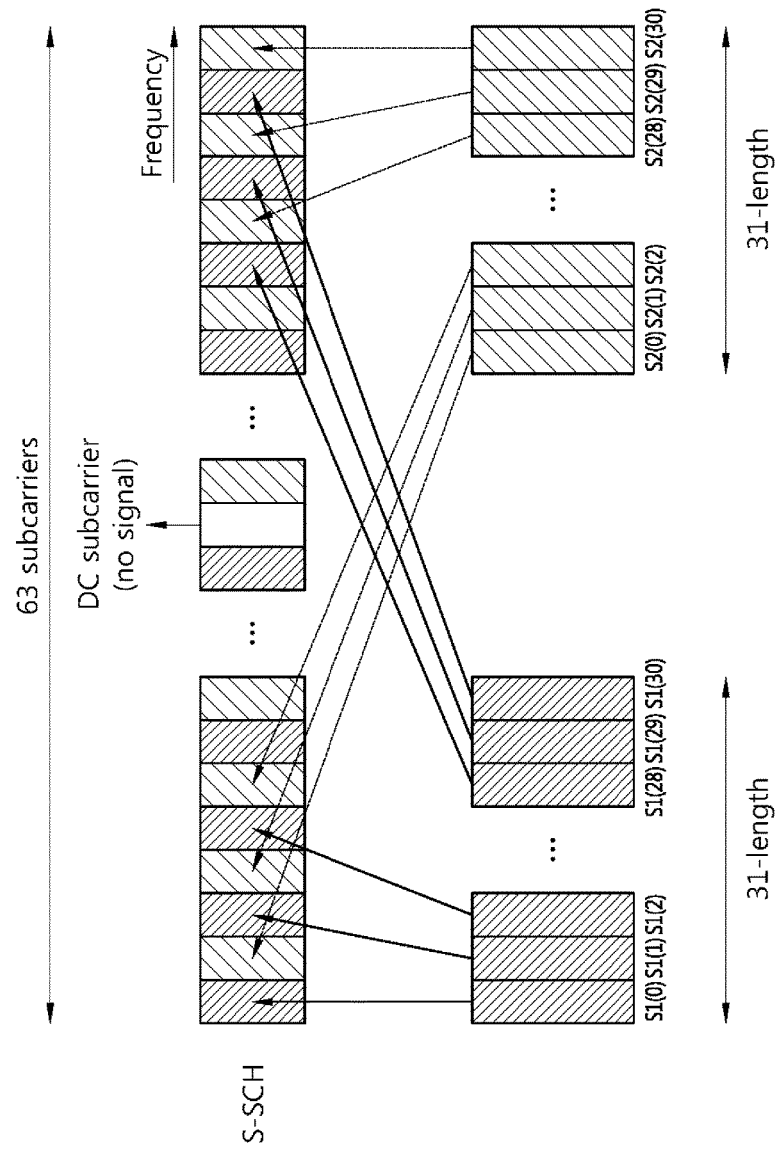
FIG. 7 shows a case where two sequences in a logical domain are interleaved and mapped in a physical domain.

FIG. 7 shows a case where two sequences in a logical domain are interleaved and mapped in a physical domain.

Referring to FIG. 7, when two m-sequences used to generate an SSS code are respectively defined by S1 and S2, if an SSS of a subframe 0 transmits a cell group ID by combining the two sequences (S1, S2), an SSS of a subframe 5 is transmitted by swapping to (S2, S1), thereby being able to identify a boundary of 10 m frame. The SSS code used herein uses a generator polynomial of $x^5+x^2+1$, and 31 codes can be generated by using different circular shifts.

To improve reception performance, two different PSS-based sequences are defined and then are scrambled to an SSS such that different sequences are scheduled to S1 and S2. Thereafter, an S1-based scheduling code is defined, and scheduling is performed on S2. In this case, a code of the SSS is swapped in a unit of 5 ms, whereas the PSS-based scrambling code is not swapped. The PSS-based scrambling code can be defined as a version of 6 circular shifts according to an index of PSS at an m-sequence generated from a generator polynomial of $x^5+x^3+1$. The S1-based scrambling code can be defined as a version of 8 circular shifts according to an index of S1 at an m-sequence generated from a generator polynomial of $x^5+x^4+x^3+x^2+x^1+1$.

Figure 8:
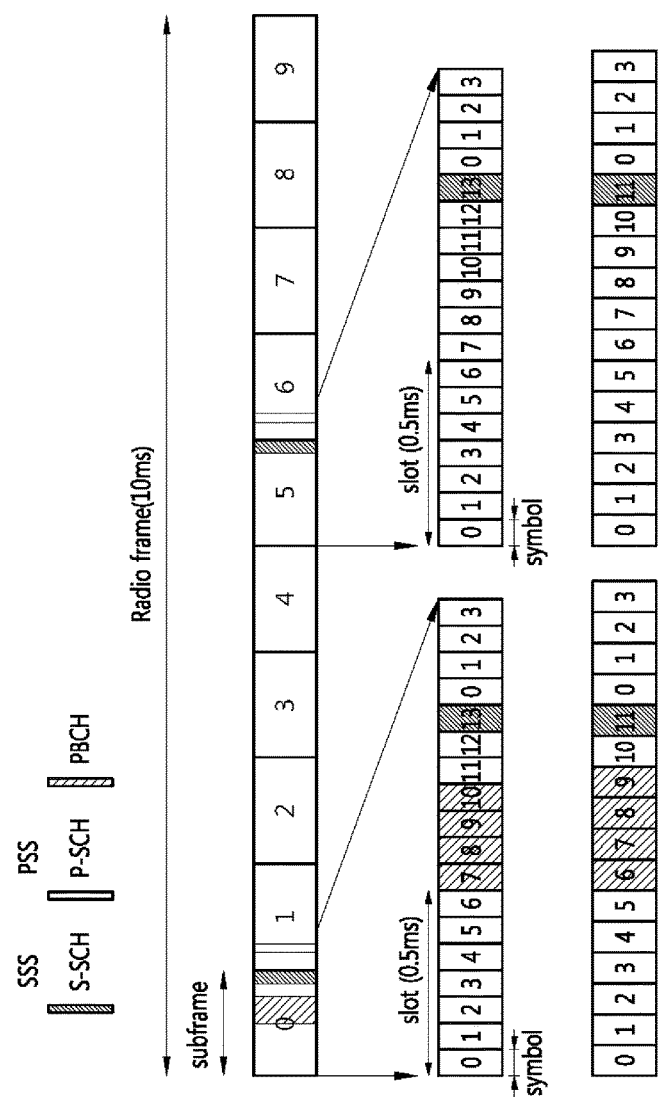
FIG. 8 shows a frame structure for transmitting a synchronization signal in the conventional TDD frame.

FIG. 8 shows a frame structure for transmitting a synchronization signal in the conventional TDD frame.

In a TDD frame, a PSS is transmitted in a third OFDM symbol of third and $13^{th}$ slots. An SSS is transmitted three OFDM symbols earlier than the OFDM symbol in which the PSS is transmitted. A PBCH is transmitted in first 4 OFDM symbols of a second slot of a first subframe.

Now, a carrier aggregation system will be described.

Figure 9:
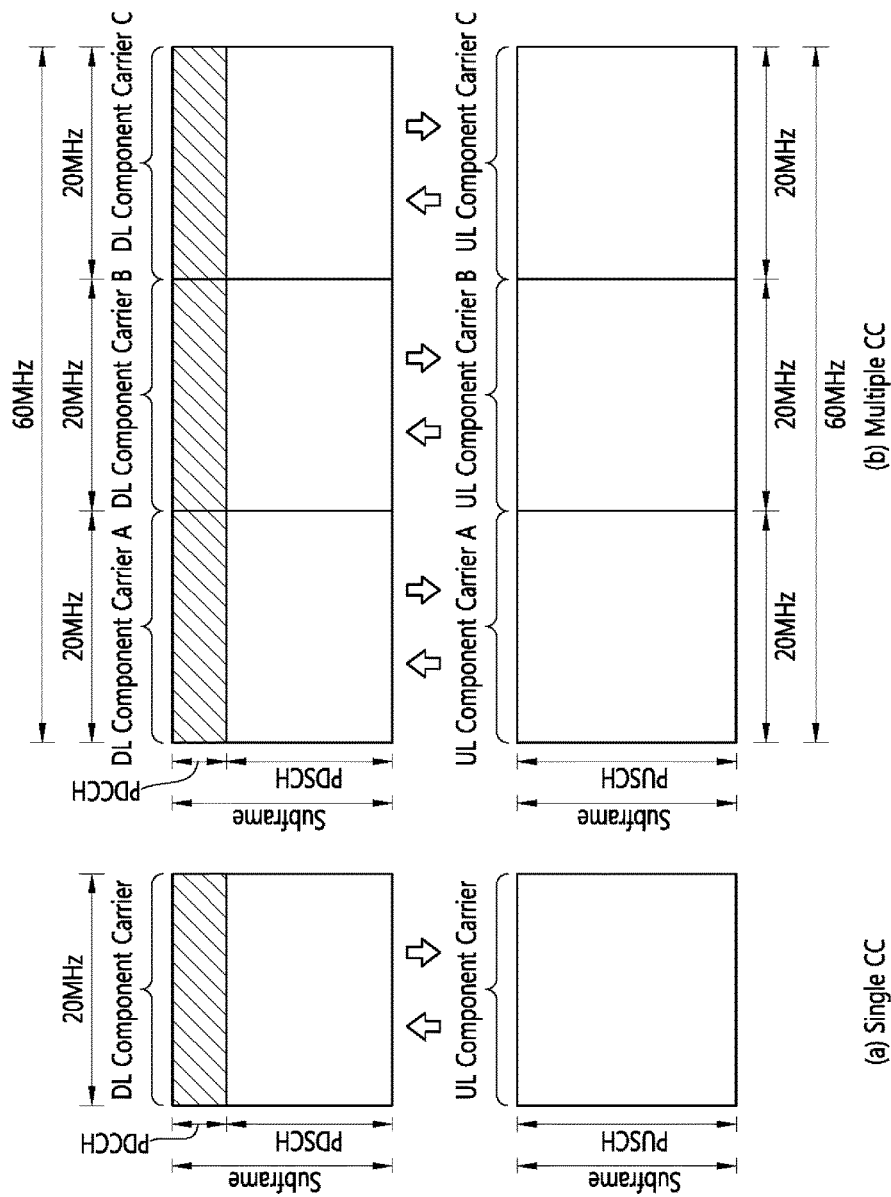
FIG. 9 shows an example of comparing a single-carrier system and a carrier aggregation system.

FIG. 9 shows an example of comparing a single-carrier system and a carrier aggregation system.

Referring to FIG. 9, only one carrier is supported for a UE in an uplink and a downlink in the single-carrier system. Although the carrier may have various bandwidths, only one carrier is assigned to the UE. Meanwhile, multiple component carriers (CCs) (i.e., DL CCs A to C and UL CCs A to C) can be assigned to the UE in the carrier aggregation (CA) system. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a carrier having a bandwidth of 1.4 MHz, 3 MHz, 5 MHz, 10 MHz, 15 MHz, and 20 MHz, and a 3GPP LTE-A system can configure a broadband of 20 MHz or higher by using each carrier of the 3GPP LTE system as a CC.

Alternatively, the broadband can be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell.

In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

When carrier aggregation is configured, the UE has only one RRC connection with the network. In an RRC connection establishment/re-establishment, handover process, one cell provides non-access stratum (NAS) mobility information and a security input. Such a cell is called a primary cell. In other words, the primary cell implies one serving cell which provides a security input in an RRC connection establishment procedure/connection re-establishment procedure/handover procedure performed by the UE with respect to the BS.

The secondary cell implies a cell configured to provide an additional radio resource after establishing an RRC connection through the primary cell.

The serving cell is configured with the primary cell in case of a UE of which carrier aggregation is not configured or which cannot provide the carrier aggregation. If the carrier aggregation is configured, the term 'serving cell' is used to indicate a cell configured for the UE, and the cell may be plural in number. A plurality of serving cells may be configured with a set consisting of a primary cell and one or a plurality of cells among all secondary cells.

A primary component carrier (PCC) denotes a CC corresponding to the primary cell. The PCC is a CC that establishes an initial connection (or RRC connection) with the BS among several CCs. The PCC serves for connection (or RRC connection) for signaling related to a plurality of CCs, and is a CC that manages a UE context which is connection information related to the UE. In addition, the PCC establishes a connection with the UE, and thus always exists in an activation state when in an RRC connected mode. A downlink CC corresponding to the primary cell is called a downlink primary component carrier (DL PCC), and an uplink CC corresponding to the primary cell is called an uplink primary component carrier (UL PCC).

A secondary component carrier (SCC) denotes a CC corresponding to a secondary cell. That is, the SCC is a CC allocated to the UE in addition to the PCC. The SCC is an extended carrier used by the UE for additional resource allocation or the like in addition to the PCC, and can be in an activation state or a deactivation state. A DL CC corresponding to the secondary cell is called a DL secondary CC (SCC). A UL CC corresponding to the secondary cell is called a UL SCC.

The primary cell and the secondary cell have the following features from a perspective of each UE.

First, the primary cell is used for PUCCH transmission. Second, the primary cell is always activated, whereas the secondary cell is activated/deactivated according to a specific condition. Third, when the primary cell experiences a radio link failure (RLF), RRC re-establishment is triggered. Fourth, the primary cell can change by a handover procedure accompanied by a random access channel (RACH) procedure or security key modification. Fifth, non-access stratum (NAS) information is received through the primary cell. Sixth, in case of an FDD system, the primary cell always consists of a pair of a DL PCC and a UL PCC. Seventh, for each UE, a different CC can be configured as the primary cell. Eighth, the primary cell can be replaced only through a handover, cell selection/cell reselection process. When adding a new secondary cell, RRC signaling can be used for transmission of system information of a dedicated secondary cell.

Regarding a CC constituting a serving cell, a DL CC can construct one serving cell. Further, the DL CC can be connected to a UL CC to construct one serving cell. However, the serving cell is not constructed only with one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC(carrier #0)+20 MHz CC(carrier #1)+20 MHz CC(carrier #2)+20 MHz CC(carrier #3)+5 MHz CC(carrier #4).

As described above, the carrier aggregation system can support multiple component carriers (CCs) unlike a single-carrier system.

The present invention will now be described.

In the carrier aggregation system, one UE may transmit and receive data/control information using multiple cells. The UE uses a cell that is initially connected as a primary cell, and uses the cell that is additionally configured through the primary cell as a secondary cell.

As described above, the primary cell is used for the operation for maintaining the connection between a BS and a UE. For example, in the primary cell may be performed the operations such as radio link management (RLM), radio resource management (RRM), reception of system information, physical random access channel (PRACH) transmission, uplink control channel (PUCCH) transmission, and the like. Meanwhile, the secondary cell is mainly used for the transmission of the scheduling information for data channels or the data channels.

The primary cell and the secondary cell are UE-specific. When multiple cells exist in a system, each of the cells may be used for the primary cell or the secondary cell, and each of the UEs uses one of the multiple cells as the primary cell. That is, an arbitrary cell may be used as the primary cell or the secondary cell. Accordingly, all of the cells are configured to perform the operation of the primary cell.

Accordingly, all of the cells are expected to implement all of these operations such as the transmission of synchronization signal, the transmission of broadcast channel, the transmission of CRS, the configuration of PDCCH region, and the like are implemented. Those cells may be referred to as backward compatible cells or legacy carrier type (LCT) in the aspect of carrier.

Meanwhile, if a cell is used as the secondary cell in the future wireless communication system, it is considered to introduce the cell of which a part or all of the unnecessary information is removed. Such a cell may be represented not to have backward compatibility, and referred to as a new carrier type (NCT) or extension carrier in comparison with the LCT. For example, in the NCT, it may be configured to transmit the CRS only at a part of time interval or only at frequency interval without transmitting in every subframe, or the DL control channel region may be newly configured, which is specified for each UE by removing the DL control channel region such as existing PDCCH or reducing to a time region or frequency region. Such an NCT may be a carrier in which only DL transmission is allowed. Hereinafter, the carrier in which only DL transmission is allowed is short for a DL only carrier, for the convenience.

Figure 10:
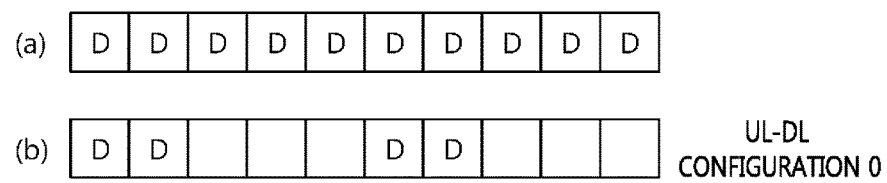
FIG. 10 exemplifies the DL only carrier.

FIG. 10 exemplifies the DL only carrier.

The DL only carrier may be configured by various methods. For example, in FDD, the DL only carrier may be a cell in which only DL CC exists. That is, as shown in FIG. 10(*a*), in FDD, the DL only carrier may be the DL CC in which corresponding UL CC does not exist. Or, even for the DL CC in which exists the UL CC that is linked by system information block (SIB), the DL only carrier may be configured by setting to use only DL CC without using the UL CC.

In TDD, the DL only carrier uses the UL-DL configuration of Table 1 and it is available to be generated to use the DL subframe only according to the corresponding UL-DL configuration. In the LCT, UL subframe/DL subframe are included by time division in a frame according to the UL-DL configuration defined in Table 1, but in the DL only carrier, only DL subframe is included as shown in FIG. 10(*b*). However, such a method causes resource waste since the subframe which is supposed to be configured as UL subframe is not going to be used according to the UL-DL configuration.

Accordingly, in case that the DL only carrier is used in TDD, it is preferable that all of the subframes in a frame are comprised of DL subframes only.

For this, additional UL-DL configuration may be added in the conventional UL-DL configuration as shown in Table 1. The following table represents an example of UL-DL configuration according to the present invention.

TABLE 2

| Uplink-downlink configuration | Downlink-to-Uplink Switch-point periodicity | subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
| 7 | — | D | D | D | D | D | D | D | D | D | D |

In Table 2, UL-DL configurations 0 to 6 are the same as those of the existing UL-DL configuration, and the UL-DL configuration 7 is added onto it. The UL-DL configuration 7 represents that all of the subframes in a frame are configured as DL subframe. It may be limited that UL-DL configuration 7 is used only for the secondary cell without being used for the primary cell. In other words, in order to avoid interference between frequency bands, it may be limited that the DL only carrier use only frequency band (the secondary cell) which is different from that of the existing TDD primary cell.

Or the BS and the UE may configure the DL only carrier using the following method. That is, the BS transmits the UL-DL configuration and switch information. The UL-DL configuration may be one of the existing UL-DL configurations 0 to 6 of Table 1.

The switch information may be the information that represents UL whether it is changed to the UL subframe in the corresponding UL-DL configuration, and whether it is changed to the DL subframe of a special subframe. According to the switch information, all of the UL subframes (or S subframe) in a frame may be switched to the DL subframe, or only a part of UL subframes (or S subframe) may be switched to DL subframe. The switch information may be implemented in various ways. For example, the switch information represents whether the UL subframe (or S subframe) has been used or not, but what the UL subframe (or S subframe) has been not used may mean that the UL subframe (or S subframe) is used as a DL subframe.

For the configuration of the DL only carrier, it may be applied for the method of stopping the use of the UL subframe (for example, only suspending the channel which is transmitted from the first SC-FDMA symbol are transmitted in the UL subframe such as PUSCH, PUCCH, and so on but available to use the channel which is transmitted from the last SC-FDMA symbol of the UL subframe such as SRS) or the method that the configuration of the UL subframe is changed to the DL subframe to use.

Herein, it is available to change the S subframe to the DL subframe owing to not using the UL subframe. In case of changing the S subframe only to GP and the DL subframe that doesn't contain the UpPTS to use without switching the UL subframe to the DL subframe, there is advantages that the unnecessary GP and UpPTS may be used in downlink and the time relations of the control channel transmission of the DL/UL HARQ process, data channel transmission, HARQ-ACK transmission and so on in the existing UL-DL configuration may be applied same as the existing definition without any changes. Or, in case of utilizing the existing TDD UL-DL configuration not using the UL subframe while the DL subframe is left, it is available to designate to use the UL-DL configuration 5 only which has the least UL subframes.

The UE, if the switch information is detected, switches the UL subframe (or the S subframe) of the UL-DL configuration to the DL subframe. The switch information may transmit in the corresponding cell-specific signaling or UE-specific signaling.

If the DL only carrier use is used for the carrier aggregation, there is an advantage that the DL only carrier use above is shared as the secondary cell between the FDD terminal and the TDD terminal in common.

Or the NCT may be a carrier in which only UL transmission is allowed. Hereinafter, the carrier in which only UL transmission is allowed is short for a UL only carrier, for the convenience.

Figure 11:
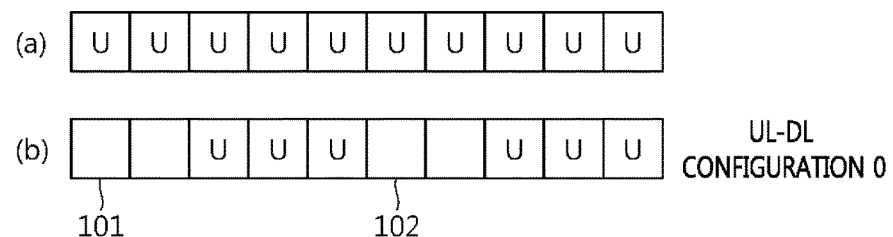
FIG. 11 exemplifies the UL only carrier.

FIG. 11 exemplifies the UL only carrier.

The UL only carrier may be configured by various methods. For example, in FDD, the UL only carrier may be a cell in which only UL CC exists. That is, as shown in FIG. 12(a), in FDD, the UL only carrier may be the DL CC in which corresponding UL CC does not exist. Or, even for the UL CC in which exists the UL CC that is linked by system information block (SIB), the UL only carrier may be configured by setting to use only UL CC without using the DL CC.

In TDD, the UL only carrier uses the UL-DL configuration of Table 1 and it is available to be generated to use only UL subframe without using the DL subframe according to the corresponding UL-DL configuration. In the LCT, UL subframe/DL subframe are included by time division in a frame according to the UL-DL configuration defined in Table 1, but in the UL only carrier, only UL subframe is included as shown in FIG. 10(b). However, such a method causes resource waste since the subframe (for example, 101 and 102) which is supposed to be configured as DL subframe is not going to be used according to the UL-DL configuration.

Accordingly, in case that the UL only carrier is used in TDD, it is preferable that all of the subframes in a frame are comprised of UL subframes only.

For this, additional UL-DL configuration may be added in the conventional UL-DL configuration as shown in Table 1. The following table represents an example of UL-DL configuration according to the present invention.

TABLE 3

| Uplink-downlink configuration | Downlink-to-Uplink Switch-point periodicity | subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 3-continued

| Uplink-downlink configuration | Downlink-to-Uplink Switch-point periodicity | subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
| 7 | — | U | U | U | U | U | U | U | U | U | U |

In Table 3, UL-DL configurations 0 to 6 are the same as those of the existing UL-DL configuration, and the UL-DL configuration 7 is added onto it. The UL-DL configuration 7 represents that all of the subframes in a frame are configured as UL subframe. It may be limited that UL-DL configuration 7 is used only for the secondary cell without being used for the primary cell. In other words, in order to avoid interference between frequency bands, the UL only carrier may be used for the secondary cell in a different frequency band which is different from that of the existing TDD primary cell. The method above may define the UL-DL configuration 7 in order to configure the DL only carrier and directly notify it to a UE.

Meanwhile, a BS selects one of the DL only carrier and the UL only carrier and aggregates it as a secondary cell, UL-DL configuration 7 of Table 2 may be added to Table 3. That is, total nine UL-DL configurations may be included in Table 3, and UL-DL configuration 7 of Table 2 may be added to Table 3 as UL-DL configuration 8.

Or, a BS uses the existing UL-DL configurations 0 to 6 but may additionally use the method of transmitting information indicating the DL only carrier or the UL only carrier.

Hereinafter, in case of aggregating the DL only carrier as the secondary cell to the primary cell that operates as the TDD, the DL HARQ-ACK (hereinafter, shortened by HARQ-ACK) timing will be described. Hereinafter, in the DL only carrier, it is assumed that all subframes in a frame are comprised of DL subframes as shown in FIG. 10(a).

The existing FDD, the HARQ-ACK timing is to transmit the ACK/NACK for a data unit (for example, a transmission block, codeword, and etc.) that a UE receives in subframe n−4 by subframe n.

In TDD has the HARQ-ACK timing as represented by following table. In Table 4, each value may be represented by aggregation K, and has the element of $K=\{k_0, k_1, \ldots, k_{M-1}\}$. For example, in UL-DL configuration 1, $K=\{7, 6\}$ and $M=2$ for subframe 2. The terms $k_0, k_1, \ldots, k_{M-1}$ may be represented by $k_m$ ($m=0, 1, \ldots,$ or $M-1$).

That is, it signifies that the ACK/NACK for the PDSCH which is transmitted from subframe $n-k_m$ is transmitted from UL subframe n.

However, in case of using the DL only carrier for a secondary cell, the configuration of DL HARQ timing of the secondary cell may be problematic. That is, the configuration of ACK/NACK response timing through the primary cell for the PDSCH which is received from the secondary cell may be problematic.

Method 1

Method 1 is the method that the HARQ-ACK timing for a secondary cell is to follow the DL HARQ-ACK timing which is configured according to the UL-DL configuration which is configured in a primary cell. For example, in case that the primary cell is a TDD cell and uses UL-DL configuration 1 and the secondary cell is the DL only carrier, the ACK/NACK for the data unit which is received from subframe 0 of the secondary cell is transmitted from subframe 7 of the primary cell, in this time, subframe 7 is a subframe configured to transmit ACK/NACK for the data unit which is received from subframe 0 of the primary cell.

Method 2

There is a configuration that the number of DL subframe is more than that of the UL subframe in a frame among the UL-DL configurations. For example, UL-DL configurations 2, 4, 5, and the like have more DL subframes more than UL subframes. Like this, the DL HARQ-ACK timing according to the UL-DL configuration that has more DL subframes may be used as the HARK-ACK reference timing of a secondary cell. However, the UL subframes according to the UL-DL configuration of the secondary cell should be subset of the UL subframes according to the UL-DL configuration of a primary cell.

For example, in case that the UL-DL configuration of the primary cell is 0, 1 and 2, the HARQ-ACK timing according to UL-DL configuration 2 and 5 may be used as the HARK-ACK reference timing of a secondary cell. In case that the UL-DL configuration of the primary cell is 3, 4, 5 and 6, the HARQ-ACK timing according to UL-DL configuration 5 may be used as the HARK-ACK reference timing of a secondary cell.

According to Method 1 and Method 2 above, a HARQ-ACK timing is determined for the DL subframe of the secondary cell which is overlapped with the DL subframe of the primary cell. However, a HARQ-ACK timing is not determined for the DL subframe of the secondary cell which is overlapped with the UL subframe of the primary cell. The HARQ-ACK timing for the DL subframe of the secondary cell which is overlapped with the UL subframe of the

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 4 shown above represents the corresponding relation of the DL subframe $n-k_m$ that corresponds to UL subframe n in each UL-DL configuration as the value of $k_m$.

primary cell may use one of the following methods. That is, Methods 1 and 2 and Methods 3 to 7 may be used with being combined.

Method 3

This is the method for selecting the subframe of the fastest primary cell that satisfies the minimum required time (for example, $k_m=4$) which is available to ACK/NACK after receiving a data unit in the subframe of the secondary cell.

Method 4

Method 4 is the method that the number of ACK/NACK transmitted from each UL subframe is to be equally arranged in the multiple UL subframes preferably without being biased to a specific UL subframe by equalizing the number of DL subframe of the secondary cell that corresponds to each UL subframe of the primary cell preferably.

First of all, Method 4 selects the subframe of the fastest primary cell that satisfies the minimum required time (for example, $k_m=4$) which is available to ACK/NACK after receiving a data unit in each subframe of the secondary cell. By setting the biggest value $k_m$ which is determined in each subframe as a reference timing, the UL subframe of the primary cell which is to transmit ACK/NACK for the data unit which is received from each subframe of the secondary cell is determined. As an example, the maximum ACK/NACK bit that is available to be transmitted by one UL subframe is determined, and if it exceed the maximum ACK/NACK bit, the UL subframe which is to transmit the ACK/NACK that exceeds the maximum ACK/NACK bit may be changed to the next UL subframe or the previous UL subframe. In this time, the UL subframe is changed such that the ACK/NACK for the forgoing PDSCH is not to be transmitted later than the ACK/NACK for the following PDSCH.

The maximum ACK/NACK bit may be changed according to the UL-DL configuration.

When equally distributing the UL subframe of the primary cell that transmits ACK/NACK, the method of equally distributing with including the timing in the existing UL-DL configuration, or the method of equally distributing with new timing, that is, the timing which is added in case of using the secondary cell as the DL only carrier.

In case of performing equal distribution considering the timing of the existing UL-DL configuration, HARQ-ACK timing is deducted as represented by following table. Table 5 may be added to Table 4.

TABLE 5

| UL-DL Configuration (Primary cell) | 0 | 1 | 2 | 3 | 4 | 5 | 6 | 7 | 8 | 9 |
|---|---|---|---|---|---|---|---|---|---|---|
| 0 | — | — | 5 | 5, 4 | — | — | — | 5 | 5, 4 | — |
| 1 | — | — | 5 | 5 | — | — | — | 5 | 5 | — |
| 2 | — | — | 5 | — | — | — | — | 5 | — | — |
| 3 | — | — | 10 | 10 | 10 | — | — | — | — | — |
| 4 | — | — | 10 | 10 | — | — | — | — | — | — |
| 5 | — | — | 10 | — | — | — | — | — | — | — |
| 6 | — | — | 8 | 6 | 6 | — | — | 5 | 5 | — |

According to the method of equally distributing for only new timing, the following Table 6 may be Table 4.

TABLE 6

| UL-DL Configuration (Primary cell) | 0 | 1 | 2 | 3 | 4 | 5 | 6 | 7 | 8 | 9 |
|---|---|---|---|---|---|---|---|---|---|---|
| 0 | — | — | 5 | 5 | 5 | — | — | 5 | 5 | 5 |

Figure 12:
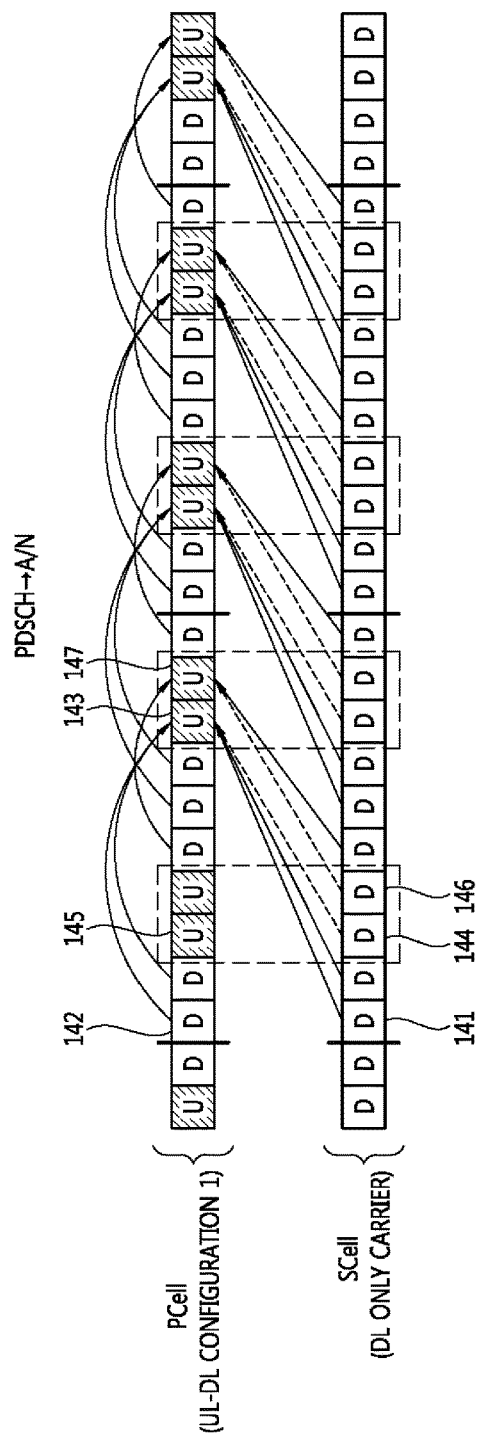
FIG. 12 shows the HARQ-ACK timing in case that Method 1 and Method 4 are combined.

FIG. 12 shows the HARQ-ACK timing in case that Method 1 and Method 4 are combined.

Referring to FIG. 12, the primary cell is a TDD cell according to UL-DL configuration 1, and the secondary cell uses the DL only carrier. In this case, the secondary cell is comprised of only DL subframes. The ACK/NACK for the PDSCH (or transmission block) which is received from the DL subframe of the secondary cell follows the HARQ-ACK timing of the primary cell.

For example, the ACK/NACK for the PDSCH which is received from the DL subframe 141 of the secondary cell is identical to the ACK/NACK transmission timing for the PDSCH which is received from the DL subframe 142 of the primary cell that corresponds to the DL subframe 141, and accordingly, transmitted from the UL subframe 143 of the primary cell. The solid arrow lines shown in FIG. 12 represent the ACK/NACK transmission of the secondary cell according to the HARQ-ACK timing of the primary cell.

Meanwhile, the HARQ-ACK timing of the DL subframe of the secondary cell which is overlapped with the UL subframe of the primary cell is set according to Method 4, becomes the HARQ-ACK timing according to the broken arrow lines in FIG. 12. For example, the ACK/NACK for the data unit which is received from the subframe 144 is transmitted from the UL subframe 143 which is located behind 4 subframes and the fastest. The ACK/NACK for the data unit which is received from the subframe 146 is transmitted from the UL subframe 143 which is located behind 4 subframes and the next UL subframe 147, not the fastest UL subframe 143. This is for equal distribution. In this case, the maximum ACK/NACK bit which is available to be transmitted from one UL subframe may be 3 bits.

According to the method, there is an effect of dispersing load since the bit number of ACK/NACK that should be transmitted from one UL subframe can be equalized.

Method 5

This is the method of limiting the PDSCH scheduling for a specific DL subframe of the secondary cell. For example, the PDSCH scheduling for the DL subframe of the secondary cell which is overlapped with the UL subframe of the primary cell is to be limited.

Exceptionally, the PDSCH transmission that does not require ACK/NACK response from the DL subframe of the secondary cell may be allowed. For example, there may be SIB transmission which is transmitted to the PDSCH.

Method 5 is available to be configured even though the UL-DL configuration which is comprised of only DL subframes like UL-DL configuration 7 of Table 2 is not introduced. For example, the existing UL-DL configurations 0 to 6 are allocated to the DL only carrier, but all of the special subframes may be used as the same structure of the other DL subframe. This is because the configuration of DwPTS, GP and UwPTS are not required in the special subframe since the UL subframe is not used. In this case, when aggregating the DL only carrier in the secondary cell, the signaling notifying that it is the DL only carrier with the UL-DL configuration information (0 to 6). For example, the information notifying whether the UL subframe is used in the corresponding UL-DL configuration or the special subframe is to be used as perfect DL subframe.

Method 6

Method 6 is the method of signaling the relation between the DL subframe where the PDSCH is transmitted in the secondary cell and the UL subframe of the primary cell where the corresponding ACK/NACK is transmitted by radio resource control (RRC). Method 6 may be applied to overall DL subframes of the secondary cell as well as to the DL subframe of the secondary cell which is overlapped with the UL subframe of the primary cell, also may be commonly or partly applied to the case of aggregating carriers having different UL-DL configurations.

As previously described, in the future wireless communication system, it is available to aggregate the carrier operated by TDD and the carrier operated by DD or to aggregate the carriers having different UL-DL configurations (including DL only carrier or UL only carrier). The method for determining the maximum number of DL HARQ process in the secondary cell in the time of aggregating the carriers (cells) that uses different UL-DL configurations in this way will be described. The method for determining the maximum DL HARQ process number in case that the DL referred to as j(n). Herein, n is the number of the UL subframe. Table 7 shows that j(n) is 4 for all the UL subframes.

Meanwhile, Table 4 and Table 7 show the shortest time that is taken for the identical DL HARQ process. For example, the ACK/NACK that is transmitted in subframe 2 of the UL-DL configuration 0 is regarding the PDSCH that is received prior to subframe 6 by Table 4, and in case that the ACK/NACK is NACK, the BS is going to perform retransmission after 4 subframes by Table 7. Like this, to sum up the initial transmission and the shortest retransmission available time is to be the shortest time of the DL HARQ process. The following table shows that the shortest DL HARQ process time is represented on each UL subframe by the UL-DL configuration.

TABLE 8

| UL-DL Configuration | Subframe n | | | | | | | | | | |
|---|---|---|---|---|---|---|---|---|---|---|---|
| | 0 | 1 | 2 | 3 | 4 | 5 | 6 | 7 | 8 | 9 | Max |
| 0 | — | — | {6}+4 | — | {4}+6 | — | — | {6}+4 | — | {4}+6 | 10 |
| 1 | — | — | {7,6}+4 | {4}+6 | — | — | — | {7,6}+4 | {4}+6 | — | 11 |
| 2 | — | — | {8,7,4,6}+4 | — | — | — | — | {8,7,4,6}+4 | — | — | 12 |
| 3 | — | — | {7,6,11}+4 | {6,5}+4 | {5,4}+4 | — | — | — | — | — | 15 |
| 4 | — | — | {12,8,7,11}+4 | {6,5,4,7}+4 | — | — | — | — | — | — | 16 |
| 5 | — | — | {13,12,9,8,7,5,4,11,6}+4 | — | — | — | — | — | — | — | 17 |
| 6 | — | — | {7}+4 | {7}+6 | {5}+5 | — | — | {7}+4 | {7}+7 | — | 14 | only carrier is aggregated in the primary cell that is operated by TDD as a secondary cell will be described, for example.

I. A Single Cell Operation

As described above, the TDD has the HARQ-ACK timing as shown in Table 4, if representing the initial subframe that is transmitted by the BS in case that the UE transmit ACK/NACK from the U subframe n, it corresponds to Table 7 as follows.

TABLE 7

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 4 | 6 | 5 | | | 4 | 7 | |

For example, subframe 2 in the UL-DL configuration 0 is the UL subframe, in case that the UE transmits ACK/NACK in the UL subframe, the case is represented by Table 7 that the BS is able to retransmit in the subframe after 4 subframes, that is, in subframe 6. For another example, subframe 3 in the UL-DL configuration 0 is the UL subframe, Table 7 shows the case that the BS is able to retransmit in the subframe after 7 subframes, that is, in subframe 0 of the next subframe in case that the UE transmits ACK/NACK in the UL subframe. That is, Table 7 represents the shortest subframe in which the BS is able to perform retransmission after ACK/NACK being transmitted by the BS in the same DL HARQ process.

Hereinafter, for the convenience of descriptions, the shortest time in which the BS is able to perform retransmission after ACK/NACK being transmitted by the UE is In the above table, { } is corresponding to the values of Table 4 and the values to be added is corresponding to the values of Table 7. 'Max' marked in the very right row of Table 8 means that the maximum value among the shortest DL HARQ process times is represented by respective UL-DL configurations. For the UL subframe n, if adding the maximum values of Table 4 and those of Table 7, they are the values of the very right low of Table 8. For example, in the UL-DL configuration 0, the maximum value of the shortest DL HARQ process time is 10 (subframe), and in the UL-DL configuration 1, the maximum value of the shortest DL HARQ process time is 11 (subframe).

For a single cell, it is determined that the DL subframe number that is included in the interval corresponding to the maximum value of the shortest DL HARQ process time is determined to be the maximum DL HARQ process number.

Let's mark k for the value of Table 4, and j for the value of Table 7. If the UL subframe having the maximum value of the shortest DL HARQ process time is subframe n, the DL subframe number that is included in the interval corresponding to k(n)+j(n) based on subframe n is the maximum DL HARQ process number.

FIGS. 13 to 16 illustrate the examples that the maximum DL HARQ process number is determined according to respective UL-DL configurations in a single cell.

Figure 13:
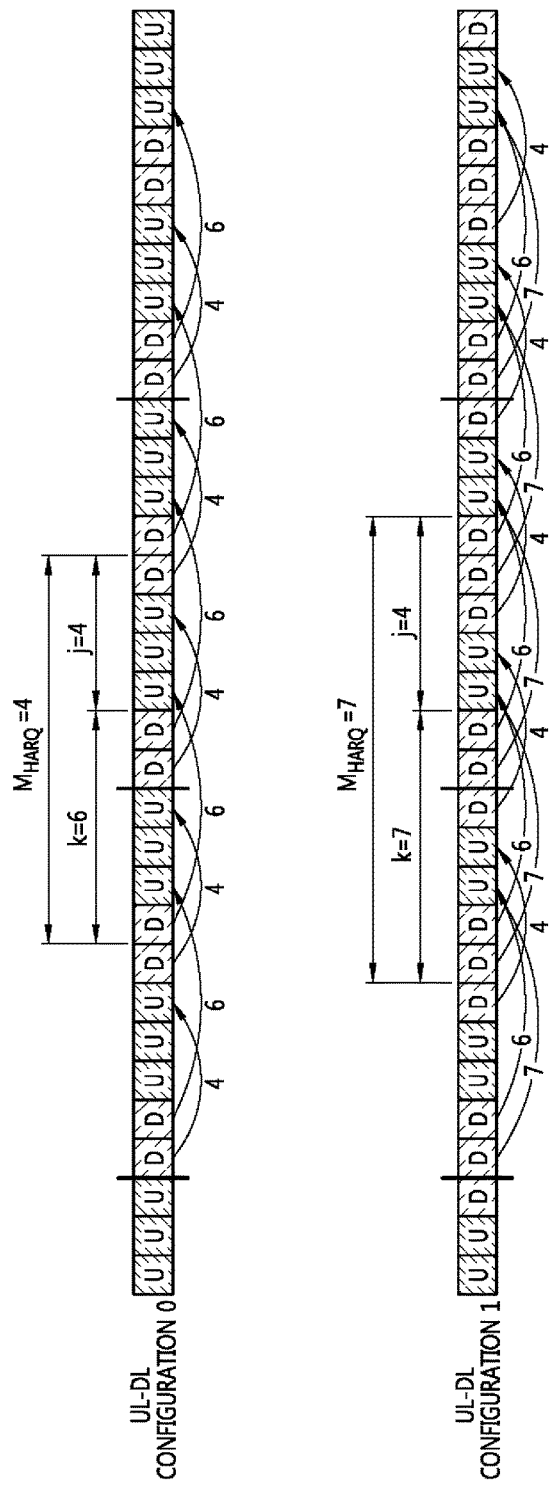
FIGS. 13 to 16 illustrate the examples that the maximum DL HARQ process number is determined according to respective UL-DL configurations in a single cell.
Figure 14:
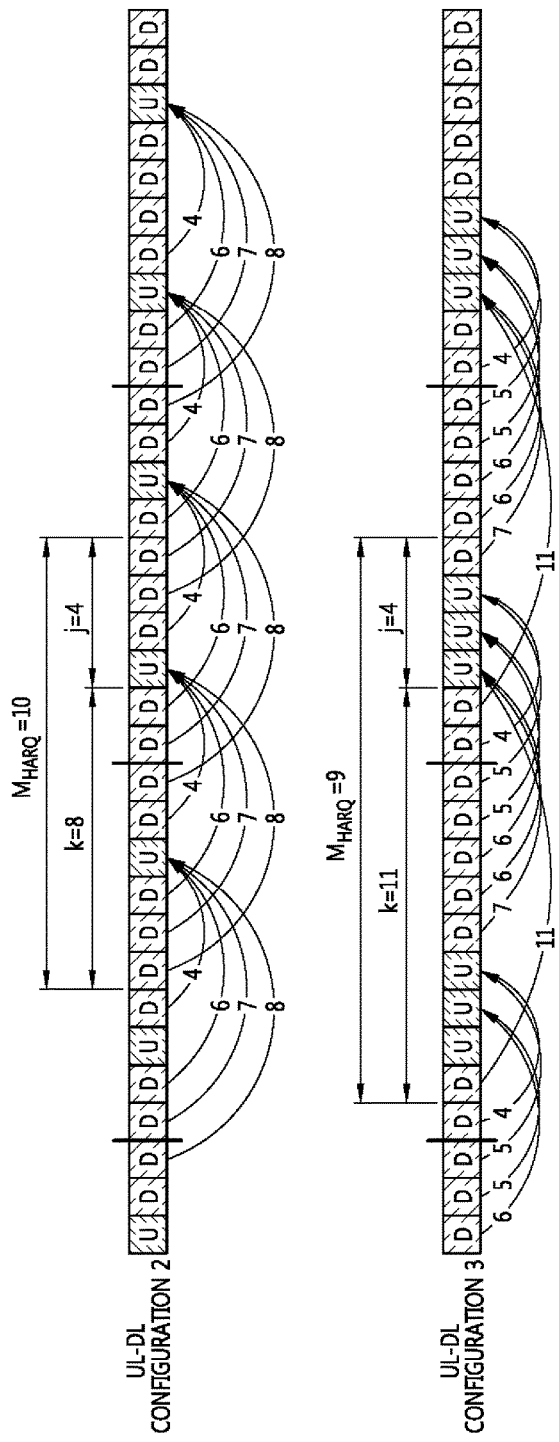
Figure 15:
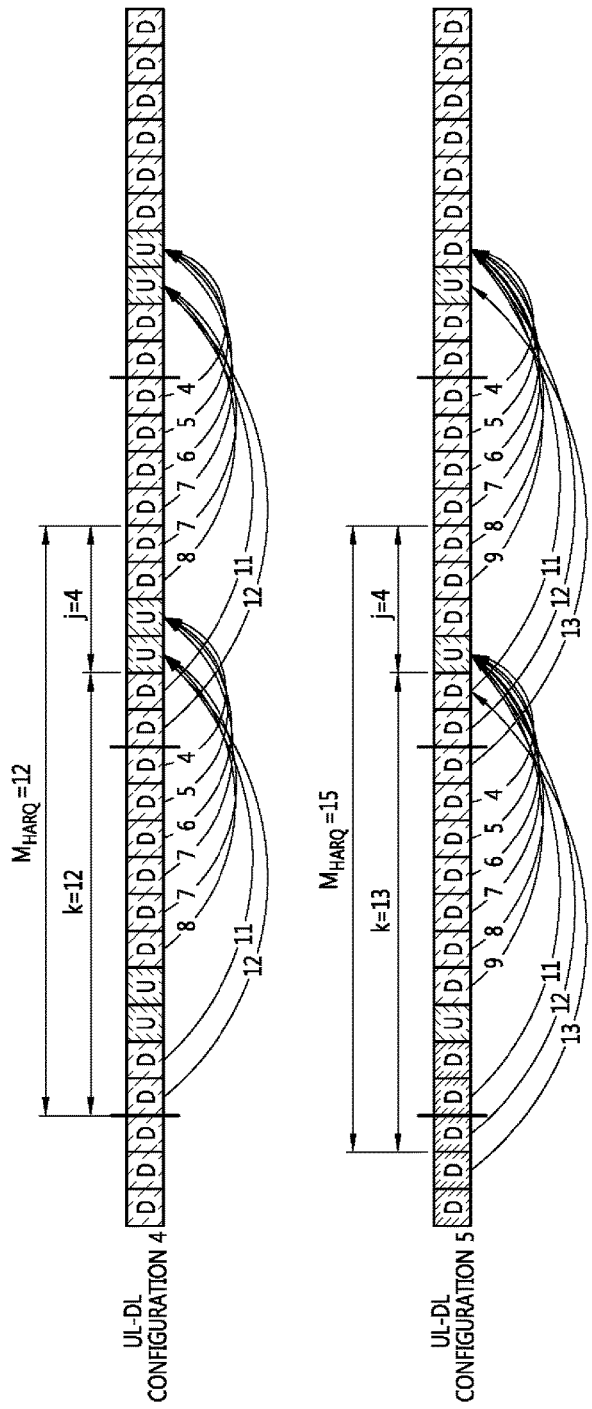
Figure 16:
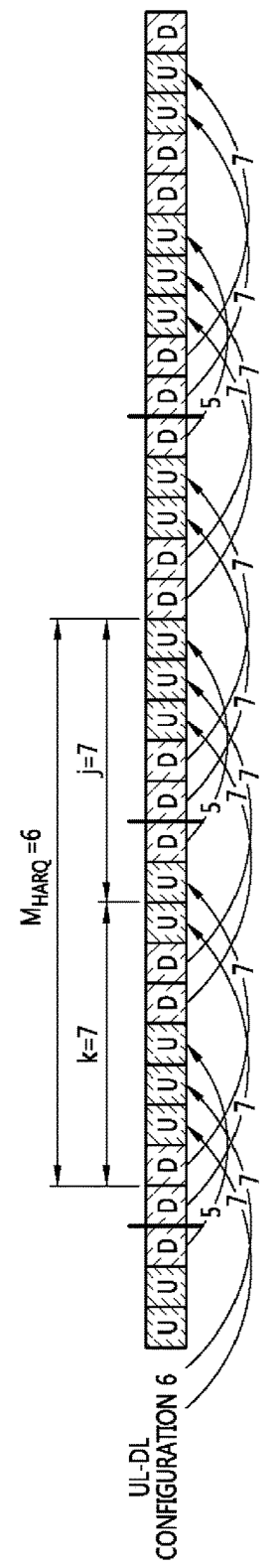

Referring to FIG. 13, in case that the UL-DL configuration is 0, the maximum DL HARQ process number (it is referred to as MHARQ) is 4, and in case that the UL-DL configuration is 1, MHARQ=7. Referring to FIG. 14, in case that the UL-DL configuration is 2, MHARQ=10. In case that the UL-DL configuration is 3, MHARQ=9. Referring to FIG. 15, in case that the UL-DL configuration is 4, MHARQ=12, and in case that the UL-DL configuration is 5, MHARQ=15. Referring to FIG. 16, in case that the UL-DL configuration is 6, MHARQ=6.

Meanwhile, in case of aggregating carriers between the carriers that uses different UL-DL configurations, the maximum DL HARQ process number should be determined considering that the ACK/NACK response is transmitted to the primary cell only. That is, it should be considered that the ACK/NACK for the data unit (e.g., PDSCH) that is received through the secondary cell is transmitted to the primary cell only. It is because that the subframe of the primary cell corresponding to the UL subframe defined as the ACK/NACK for the PDSCH is transmitted in the secondary cell may be DL subframe, and in this case, the ACK/NACK transmission timing for the PDSCH should be adjusted.

In other words, in the carrier that is used as a secondary cell, the DL HARQ timing that is different from the time when the carrier is operated as a single cell can be applied, the maximum DL HARQ process number is required to be newly determined.

Particularly, the maximum DL HARQ process number can vary according to whether non-cross carrier scheduling is applied or cross carrier scheduling is applied in the carrier aggregation system.

Figure 17:
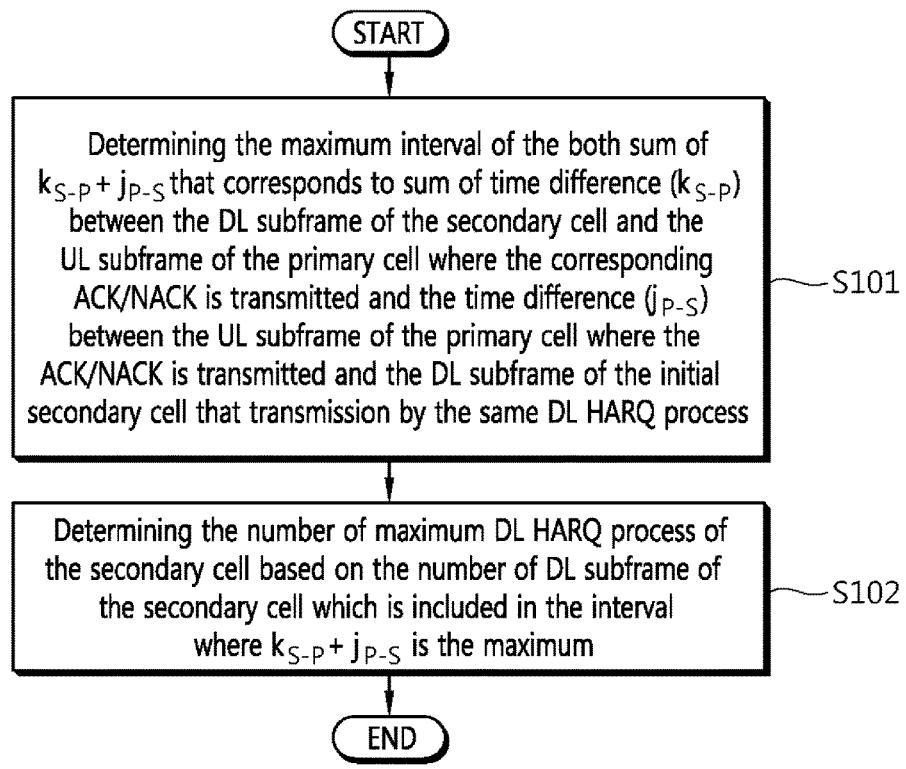
FIG. 17 exemplifies the method for the determining the maximum number of the maximum DL HARQ process of the secondary cell.

Hereinafter, for the convenience of descriptions, the primary cell is exemplified as the cell to which DL grant is transmitted, and the secondary cell is exemplified as the cell to which PDSCH is transmitted. However, this is not limited thereto. For example, if the ACK/NACK response can be transmitted to the secondary cell as well, the maximum DL HARQ process number should be determined considering FIG. 17 exemplifies the method for the determining the maximum number of the maximum DL HARQ process of the secondary cell.

The time difference is ks-p between the DL subframe of the secondary cell to which PDSCH is transmitted by DL HARQ and the UL subframe of the primary cell to which the corresponding ACK/NACK is transmitted, and the time difference is js-p the UL subframe of the primary cell to which the above ACK/NACK is transmitted and the DL subframe of the first secondary cell that is able to be transmitted by the identical DL HARQ process, and the BS determines the maximum interval of the both sum of ks-p+jp-s mentioned above (step, S101).

In case that the DL only carrier is used as the secondary cell and performs full-duplexing, the equation of jp-s=4 is always satisfied. In case of performing half-duplexing, jp-s(n)=j(n) as the value of Table 7 is applied.

In case that the DL only carrier is used as the secondary cell in the carrier aggregation system, the maximum number of DL HARQ process is determined by using the maximum value of ks-p(n)+jp-s(n).

In case that the DL only carrier is used as the secondary cell, the maximum value of ks-p(n)+jp-s(n) by the UL-DL configuration of the primary cell is represented as the following table.

TABLE 9

| UL-DL Configuration (PCell) | Subframe n | | | | | | | | | | |
|---|---|---|---|---|---|---|---|---|---|---|---|
| | 0 | 1 | 2 | 3 | 4 | 5 | 6 | 7 | 8 | 9 | Max |
| 0 | — | — | {6,[5]}+4 | {[5],[4]}+4 | {4}+4 | — | — | {6,[5]}+4 | {[5],[4]}+4 | {4}+4 | 10 |
| 1 | — | — | {7,6,[5]}+4 | {4,[5]}+4 | — | — | — | {7,6,[5]}+4 | {4,[5]}+4 | — | 11 |
| 2 | — | — | {8,7,4,6,[5]}+4 | — | — | — | — | {8,7,4,6[5]}+4 | — | — | 12 |
| 3 | — | — | {7,6,11,[10]}+4 | {6,5,[10]}+4 | {5,4,[10]}+4 | — | — | — | — | — | 15 |
| 4 | — | — | {12,8,7,11,[10]}+4 | {6,5,4,7,[10]}+4 | — | — | — | — | — | — | 16 |
| 5 | — | — | {13,12,9,8,7,5,4,11,6,[10]}+4 | — | — | — | — | — | — | — | 17 |
| 6 | — | — | {7,[8]}+4 | {7,[6]}+4 | {5,[6]}+4 | — | — | {7,[5]}+4 | {7,[5]}+4 | — | 12 | the cell to which ACK/NACK is transmitted. That is, the primary cell described below is exemplified as the cell to which ACK/NACK is transmitted.

II. Multi-Cells Operation

<The Method for Determining the Maximum DL HARQ Process Number in Case of Non-Cross Carrier Scheduling (NCCS)>

In case of NCCS, DL grant and PDSCH that is scheduled by the DL grant are transmitted in the subframe of the secondary cell. Meanwhile, the ACK/NACK for the PDSCH is transmitted to the primary cell only. In this case, for example, if the secondary cell is DL only carrier, the HARQ-ACK timing may be used with the combinations of the aforementioned method 1 to 2 and the method 3 to 6.

In a specific DL HARQ, the difference between the DL subframe of the secondary cell by which data unit (PDSCH) is received and the UL subframe of the primary cell that transmits ACK/NACK for the data unit above (PDSCH) is, hereinafter, referred to as ks-p. Further, the time difference between the UL subframe of the primary cell that transmits ACK/NACK and the first DL subframe of the secondary cell that is available to be retransmitted by the identical DL HARQ process after the ACK/NACK above mentioned is, hereinafter, referred to as jp-s. In the meantime, in case of using NCCS in the carrier aggregation system, the maximum number of DL HARQ process of the secondary cell is determined as FIG. 17 as follows.

Table 9 is the result of jp-s=4 being added to the DL HARQ-ACK timing that consists of the values of aforementioned Table 4 and Table 5. Comparing Table 9 and Table 8, there is a difference of the 'Max' value only in the UL-DL configuration 6, and there is no difference but the same on the rest.

In case of using method 2 and method 4 as the DL HARQ-ACK timing, the UL-DL configuration 5 can be used for the HARQ-ACK reference timing of the secondary cell. And then, for the UL-DL configuration of all the primary cells, the value of the very right row of the UL-DL configuration 5, 17 may be the maximum value of ks-p(n)+jp-s(n).

The BS may configure the maximum number of the DL HARQ process as a valid DL subframe of the secondary cell that is included in the determined interval or the number of the whole DL subframe (step, S102).

Herein, a valid DL subframe means the subframe that is able to transmit the data actually in the corresponding DL subframe, and a non-valid DL subframe means the subframe that is not able to transmit the data in the corresponding DL subframe.

If it becomes the valid subframe, the data channel transmission is available in the corresponding DL subframe or a control channel transmission should be available in the subframe defined that the control channel corresponding to the above data channel is to be transmitted.

Figure 18:
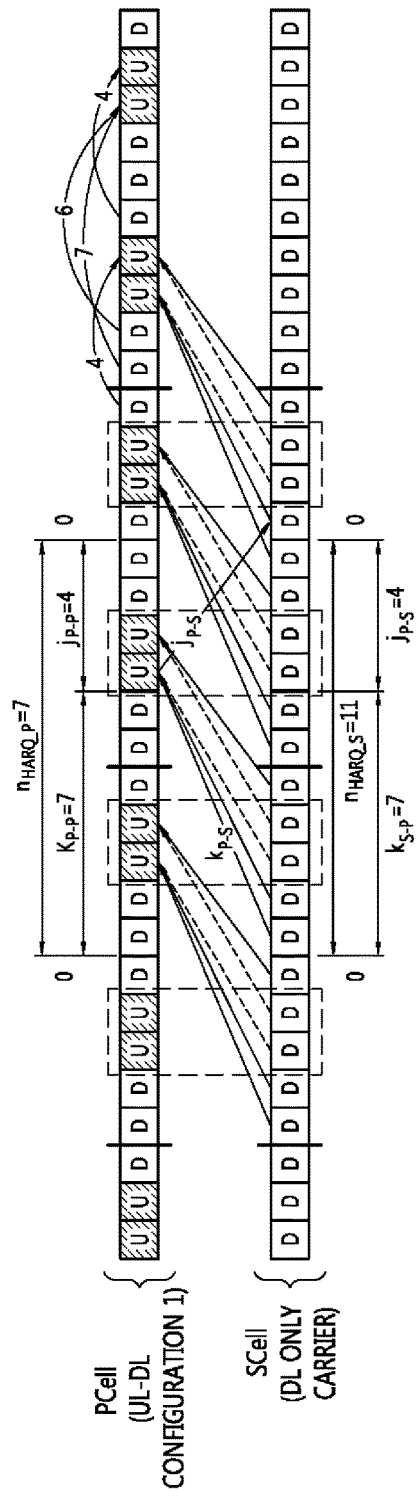
FIG. 18 and FIG. 19 illustrate an example of how to determine the maximum DL HARQ process number of the secondary cell in case of using the non-cross carrier scheduling.
Figure 19:
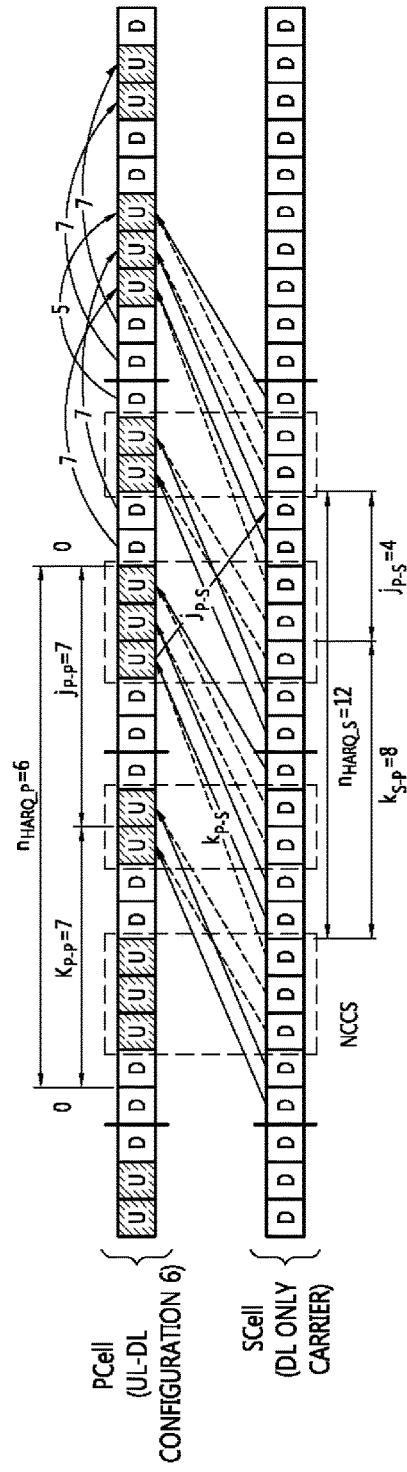

FIG. 18 and FIG. 19 illustrate an example of how to determine the maximum DL HARQ process number of the secondary cell in case of using the non-cross carrier scheduling.

Referring to FIG. 18, the primary cell is the TDD carrier and uses the UL-DL configuration 1. The secondary cell is the DL only carrier. According to Table 9, the maximum value of ks-p(n)+jp-s(n) in the UL-DL configuration 1 is 11 and, the DL subframe number of the secondary cell that is included in the interval consisting of 11 subframes is 11. Accordingly, the maximum DL HARQ process number (nHARQ_S) is 11. The maximum DL HARQ process number (nHARQ_P) of the primary cell is 7.

Referring to FIG. 19, the primary cell is the TDD carrier and uses the UL-DL configuration 6. The secondary cell is the DL only carrier. According to Table 9, the maximum value of ks-p(n)+jp-s(n) in the UL-DL configuration 6 is 12 and the DL subframe number of the secondary cell that is included in the interval consisting of 12 subframes is 12. Accordingly, the maximum DL HARQ process number (nHARQ_S) is 12. Meanwhile, the maximum DL HARQ process number (nHARQ_p) is 6.

In the above example, the maximum DL HARQ process number of the secondary cell is obtained by using the maximum value of ks-p(n)+jp-s(n) and for the modified example, the maximum value of kp(n)+jp(n) may be used as well. That is to say, the maximum DL HARQ process number can be determined according to the DL subframe number of the secondary cell that is included in the interval corresponding to the maximum value of kp(n)+jp(n).

In the meantime, in case of aggregating the TDD carrier to be the primary cell, and the DL only carrier to be the secondary cell, the maximum DL HARQ process number of the secondary cell may be configured as the same with that of the primary cell. The method may be applied to the relationship with all of the secondary cells that use different UL-DL configurations, or applied to the relationship with a part of the secondary cells only, and it may make better the complexity of implementation.

Or, the maximum DL HARQ process number of the secondary cell may be fixed to 8 same with the FDD. This is to configure same as the FDD that is made up of the DL only carrier and the UL only carrier. The method may be applied to the relationship with all of the secondary cells that use different UL-DL configurations, or applied to the relationship with a part of the secondary cells only, and it may make better the complexity of implementation. The UL HARQ process number may be fixed to 8.

Or, the BS may configure the DL HARQ process number of the secondary cell as to the RRC. In this time, it may notify the RRC of the DL HARQ process number e to be added except for the DL HARQ process number according to the reference UL-DL configuration of the secondary cell.

Or, in aggregating the TDD carrier (PCell) and the DL only carrier (SCell), the BS may determine the maximum DL HARQ process number of the secondary cell with the maximum DL HARQ process number (for example, 16), that may be configured according to the UL-DL configuration. This method is mainly applied in the case that the primary cell is the TDD and is to configure the DL HARQ process number for the secondary cell same as the primary cell. In case of having a plurality of secondary cells, it may be commonly or partly applied in this method. The UL HARQ process number may be configured to 16. This method may reduce the complexity of implementation and also may be applied to the case that the DL HARQ process number in the UL-DL configuration of the primary cell is bigger than 8.

Or, in aggregating the TDD carrier (PCell) and the DL only carrier (SCell), the BS may determine the maximum DL HARQ process number of the secondary cell with the minimum DL HARQ process number (for example, 10), that may be configured according to the UL-DL configuration. This method is mainly applied in the case that the primary cell is the TDD. In case that the secondary cells are multiple, it may be commonly or partly applied to all of the secondary cells in this method. The UL HARQ process number may be determined to 10, and reduce the complexity of implementation. This method may be applied to the case that the DL HARQ process number in the UL-DL configuration of the primary cell is smaller than 8.

<The Method for Determining the Maximum DL HARQ Process Number in Case of the Cross Carrier Scheduling (CCS)>

In the CCS different from the NCCS, the DL grant that schedules the PDSCH of the secondary cell is not transmitted in the above secondary cell but transmitted in the primary cell instead. Accordingly, the DL subframe interval of the secondary cell may be the UL subframe in the primary cell. In this case, the above PDSCH scheduling of the secondary cell should be performed in the previous DL subframe of the primary cell. Consequently, the cross subframe scheduling may be required. The cross subframe scheduling implies that the DL grant and the PDSCH are transmitted from different subframes.

The cross subframe scheduling may be configured by considering the interval in which the primary cell is the UL subframe and the secondary cell is the DL subframe and the interval in which the primary cell is the DL subframe and the secondary cell is the UL subframe.

In CCS, the minimum time (that is, the sum of the initial transmission and the shortest retransmission available time) when the identical DL HARQ process can be scheduled is determined as follows.

The time difference ks-p between the DL subframe of the secondary cell that is transmitted to the DL HARQ process and the UL subframe of the primary cell to which the corresponding ACK/NACK is transmitted is determined same with the NCC. The time jp-s, when is from the ACK/NACK transmission in the UL subframe of the primary cell to the DL subframe of the shortest secondary cell that is available to transmit the identical DL HARQ process, is determined as hp-p+gp-s. Herein, the hp-p represents the time when is from the UL subframe of the primary cell to which the ACK/NACK are transmitted by the UE to the DL subframe of the primary cell to which the retransmission DL grant for the identical HARQ process is transmitted by the BS. The gp-s represents the time difference between the DL subframe of the primary cell to which the BS transmits the retransmission DL grant and the DL subframe of the secondary cell to which the PDSCH scheduled by the retransmission DL grant is transmitted. In conclusion, jp-s=hp-p+gp-s. In the primary cell and the secondary cell, for the subframe that are all DL subframe, gp-s=0.

When applying the CCS, for the maximum interval of the ks-p+hp-p+gp-s, the maximum DL HARQ process number of the secondary cell may be configured as the valid DL subframe number of the secondary cell or the whole DL subframe number.

In aggregating between the primary cell and the secondary cell, in case that the DL only carrier is used as the secondary cell, for the UE that is operated with full-duplex or half-duplex, hp-s(n) is equal to j(n) of Table 7, and gp-s=0. That is, jp-s(n)=hp-p (n)+gp-s(n)=j(n).

In case that the DL only carrier is used as the secondary cell, the UE supports the full-duplex, and method 1 and method 4 are used for the DL HARQ-ACK timing, one of the following methods may be used in order to determine the maximum DL HARQ process number.

First, a BS determines the maximum value of ks-p(n)+jp-s(n).

In case that the CCS is used, ks-p(n)+jp-s(n) may be determined as the following table.

TABLE 10

| UL-DL Configuration for PCell | Subframe n | | | | | | | | | | |
|---|---|---|---|---|---|---|---|---|---|---|---|
| | 0 | 1 | 2 | 3 | 4 | 5 | 6 | 7 | 8 | 9 | Max |
| 0 | — | — | {6,[5]}+4 | {[5],[4]}+7 | {4}+6 | — | — | {6,[5]}+4 | {[5],[4]}+7 | {4}+6 | 12 |
| 1 | — | — | {7,6,[5]}+4 | {4,[5]}+6 | — | — | — | {7,6,[5]}+4 | {4,[5]}+6 | — | 11 |
| 2 | — | — | {8,7,4,6,[5]}+4 | — | — | — | — | {8,7,4,6[5]}+4 | — | — | 12 |
| 3 | — | — | {7,6,11,[10]}+4 | {6,5,[10]}+4 | {5,4,[10]}+4 | — | — | — | — | — | 15 |
| 4 | — | — | {12,8,7,11,[10]}+4 | {6,5,4,7,[10]}+4 | — | — | — | — | — | — | 16 |
| 5 | — | — | {13,12,9,8,7,5,4,11,6,[10]}+4 | — | — | — | — | — | — | — | 17 |
| 6 | — | — | {7,[8]}+4 | {7,[6]}+6 | {5,[6]}+5 | — | — | {7,[5]}+4 | {7,[5]}+7 | — | 14 |

Table 10 is generated by jp-s(n)=j(n) being added to the value of the DL HARQ ACK/NACK timing consisting of the values of Table 4 and Table 5. The values of ks-p(n)+jp-s(n) are represented for the UL-DL configurations of the primary cell, and the maximum value is represented in the very right 'Max' row. Comparing with Table 8, there is a difference from the maximum value of kp(n)+jp(n) of the primary cell in the UL-DL configuration 0, no difference in the rest of UL-DL configurations.

Figure 20:
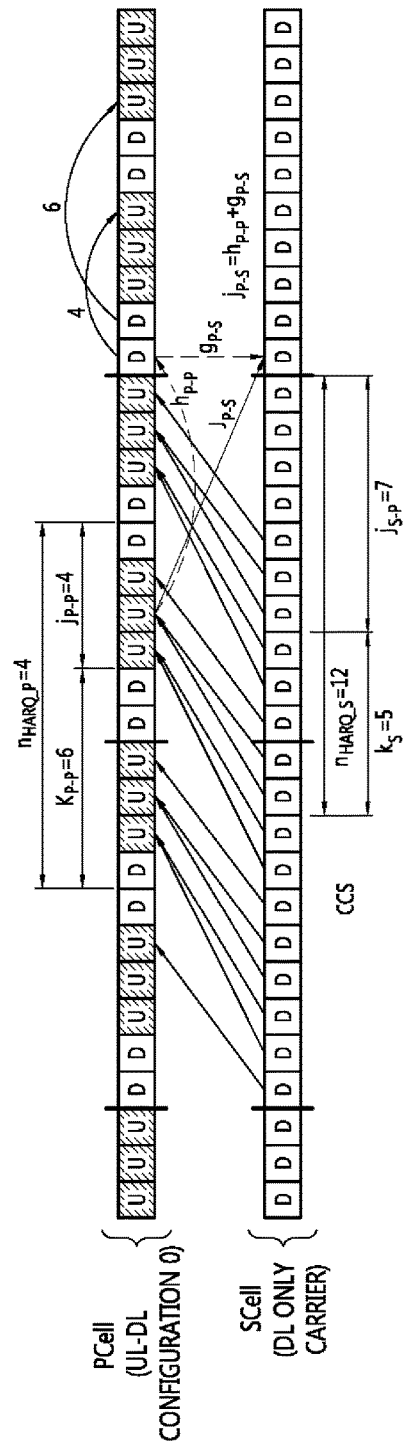
FIG. 20 illustrates the example of determining the maximum DL HARQ process number of the secondary cell in case that the CCS is used and the DL only carrier is aggregated as the secondary cell.

FIG. 20 illustrates the example of determining the maximum DL HARQ process number of the secondary cell in case that the CCS is used and the DL only carrier is aggregated as the secondary cell.

Referring to FIG. 20, the primary uses the UL-DL configuration 0 as the TDD carrier and the secondary cell is the DL only carrier. In this case, the maximum value of ks-p(n)+jp-s(n) is 12 according to the above table 10. Accordingly, the maximum DL HARQ process number (nHARQ_S) is 12. The maximum DL HARQ process number (nHARQ_P) of the primary cell is 4.

Meanwhile, if UL-DL configuration 5 is used as the reference UL-DL configuration of the secondary cell when applying Method 2 and Method 4 for the DL HARQ-ACK timing, the maximum value of ks-p(n)+jp-s(n) is 17 for the UL-DL configuration of all primary cells.

Meanwhile, in the above example, the maximum DL HARQ process number is determined of the secondary cell by using the maximum value of ks-p(n)+jp-s(n), but the maximum value of kp(n)+jp(n) may be used as well. That is, the value of the very right row may be used, and it becomes the same value of Table 10 in the UL-DL configurations except for the UL-DL configuration 0. There is an advantage that the value that is obtained by the timing of the primary cell is used as it is in this method.

Or, the maximum DL HARQ process number of the secondary cell may be configured as the same with that of the primary cell. The method may be commonly or partly applied in aggregating between different UL-DL configurations, and it may reduce the complexity of implementation.

Or, for the maximum DL HARQ process number of the secondary cell, 8 is used same with the FDD. This is to configure same as the FDD that is made up of the DL only carrier and the UL only carrier. The method may be commonly or partly applied in aggregating between different UL-DL configurations, the UL HARQ process number is determined as 8, and it may reduce the complexity of implementation as well.

Or, the BS may configure the DL HARQ process number of the secondary cell as to the RRC. In this time, it may determine the DL HARQ process number only to be added except for the DL HARQ process number according to the reference UL-DL configuration of the secondary cell as to RRC.

Or, the maximum DL HARQ process number that is available to be made up of in the UL-DL configuration of TDD (e.g., 16) may be configured as the maximum DL HARQ process number of the secondary cell. This method may be mainly applied in case that the primary cell is the TDD, and also may be used in order for the HARQ process of the secondary cell to configure same as the primary cell. It may be applied commonly or partly in aggregating between different UL-DL configurations, and the number of UL HARQ process number may be determined as to 16. The method may reduce the complexity of implementation, and it may be applied to only the case that the DL HARQ process number in the UL-DL configuration of the primary cell is bigger than 8.

Or, in TDD, the maximum DL HARQ process number of the secondary cell may be configured as the minimum DL HARQ process number that consists of in the UL-DL configuration. For example, it may be configured as to 10.

This method may be mainly applied in case that the primary cell is TDD and may apply in order for the HARQ process of the secondary cell to configure same as the primary cell. In may be applied commonly or partly in aggregating between different UL-DL configurations. The UL HARQ process number may be determined as to 10. This method may reduce the complexity of implementation, and may be applied to only the case that the DL HARQ process number in the UL-DL configuration of the primary cell is smaller than 8.

The methods described above may be applied when determining the number of UL HARQ process in the UL only carrier. In this case, some UL subframe of the UL only carrier may be excluded. For example, it may be considered excluding the UL subframe which is scheduled by the subframe #0, 1, 5 and 6 which is always fixed as the DL subframe.

The methods described above may be applied to the method of transforming the UL subframe to the DL subframe in a TDD cell and selectively using either one of UL/DL as the subframe of the secondary cell. Since the UL subframe is used as the DL subframe in these methods, the same principle may be applied. In this time, it may be applied excluding the subframe which is always fixed as either one of the UL/DL subframes.

The DL only carrier and the UL only carrier may be used at the same time as the secondary cells which is aggregated to the primary cell using one of the UL-DL configurations 0 to 6. In this case, if the DL only carrier and the UL only carrier is the pair which is linked as the SIB 2 of the FDD, the TDD primary cell and the secondary cell are aggregated.

Hereinafter, the case of using the DL only carrier as the primary cell will be described.

Figure 21:
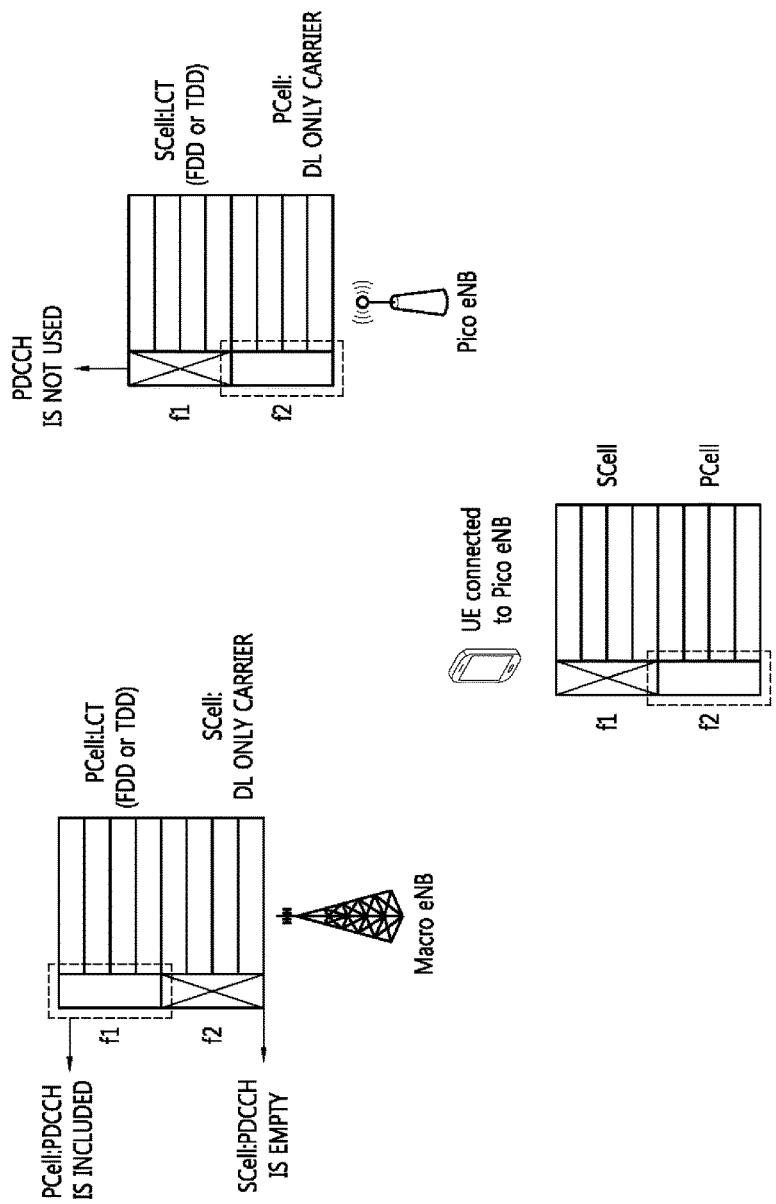
FIG. 21 exemplifies the situation of aggregating the different kind of network carrier.

FIG. 21 exemplifies the situation of aggregating the different kind of network carrier.

Referring to FIG. 21, the macro BS may use the F1 frequency band as the primary cell and use the F2 frequency band as the secondary cell. In this time, the F1 frequency band is the LCT, and may be FDD or TDD carrier. In case of FDD, a part of the F1 frequency band is used for UL carrier and the remainder is used for the DL carrier. In case of TDD, overall F1 frequency band is used and the UL subframe and the DL subframe are distinguished in the time domain.

The macro BS may transmit the PDCCH of the primary cell for each subframe using the cross carrier scheduling, and may not use the PDCCH of the secondary cell.

Meanwhile, a pico BS may use the F2 frequency band as the primary cell, and use the F1 frequency band as the second cell. In this time, the primary cell may be the DL only carrier.

If a UE access the macro BS, since the UE uses the F1 frequency band as the primary cell, the UE may perform the initial access with the macro BS using the F1 frequency band and maintain the RRC connection.

However, if a UE access the pico cell, it may be difficult to use the F1 frequency band as the primary cell due to the interference received from the macro BS. Accordingly, the UE that accesses the pico cell uses the F2 frequency band as the primary cell. However, since the F2 frequency band is used as the DL only carrier for the pico BS, there is no UL subframe. Accordingly, the UE is not able to maintain the RRC connection with the pico BS. This is because it is unable to perform the ACK/NACK transmission and the like which is used for the RRC connection through the primary cell.

In order to solve such a problem, in case that a specific BS uses the DL only carrier as the primary cell, it is suggested to share the UL CC (in case of FDD) of the secondary cell or a part or all of the UL subframe (in case of TDD) for the RRC connection.

In the example of FIG. 21, in case that a UE accesses the pico BS, a specific UL subframe of the F1 frequency band is available to be used for the initial access. The specific UL subframe may be predetermined between the UE and pico BS, and instructed through the pico BS/macro BS. However, the specific UL subframe may be limited to a part among all UL subframes in the F1 frequency band. Through this, the initial access based on the F2 frequency band and the initial access based on the F1 frequency band are not to be collided.

The physical cell index (PCI) which is used when a UE initial accesses the pico BS using the secondary cell (F1 frequency band) is used as the same as the PCI in the F2 frequency band, and the PIC after the RRC connection is established is used as the same as the DL CC (or DL subframe) in the F1 frequency band or uses the virtual cell ID which is allocated as the RRC.

As the PRACH transmission by the PDCCH instruction in the state of RRC connection, the PCI based on the F2 frequency band may be applied.

As the search space for PDCCH detection where the UL grant is transmitted in the F2 frequency band, only the common search space (CSS) can be used. Or, the user specific search space (USS) in which the CSS or cell index (CI) is 0 when initial access, and then, the USS that corresponds to the CI ($=CI_{F1}$) which is allocated when aggregating the DL CC in the F1 frequency band as the secondary cell may be used. Or, all of the USSs that corresponds to CI=0 and CI=$CI_{F1}$ may be used.

Figure 22:
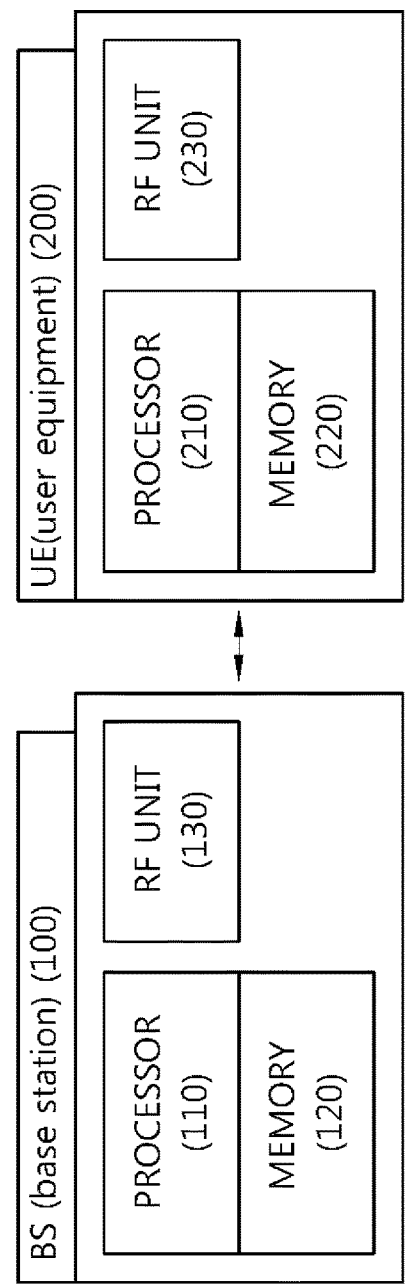
FIG. 22 is a block diagram showing a wireless apparatus for implementing an embodiment of the present invention.

FIG. 22 is a block diagram illustrating a wireless device in which an embodiment of the present invention is implemented.

ABS 100 includes a processor 110, a memory 120, and a radio frequency (RF) unit 130. The processor 110 implements the proposed functions, procedures, and/or methods. For example, the processor 110 configures multiple carriers (serving cells) to the UE, transmits a data unit, and receives ACK/NACK for the data unit according to the HARQ-ACK timing. In case of configuring the UL only carrier as the secondary cell, it may be configured through only UL-DL configuration, or configured through the switch information with the UL-DL configuration. The maximum number of DL HARQ process of the secondary cell is according to the methods described above. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 implements the function of receiving the DL data through the first subframe of the first carrier, transmitting the acknowledgement/not-acknowledgement (ACK/NACK) for the DL data through the second subframe of the second carrier, and retransmitting the DL data through the third subframe of the first carrier. In this time, the maximum number of DL HARQ process of the second carrier may be determined according to the methods described above. The second carrier may be the primary cell and the first carrier may be the secondary cell. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

What is claimed is:

1. A method for performing a hybrid automatic repeat request (HARQ) process, the method performed by a user equipment (UE) and comprising:
receiving data in a first subframe of a secondary cell; and
transmitting acknowledgement/negative-acknowledgement (ACK/NACK) information for the data in a second subframe of a primary cell,
wherein the primary cell uses a frame comprising at least one downlink subframe and at least one uplink subframe according to an uplink-downlink configuration of the primary cell,
wherein the secondary cell uses a frame comprising consecutive downlink subframes,
wherein a maximum number of HARQ processes for the secondary cell is dependent on the uplink-downlink configuration of the primary cell, and
wherein the maximum number of HARQ processes for the secondary cell is determined as shown in a below table:

| Uplink-downlink Configuration of the primary cell | Maximum number of HARQ processes for the secondary cell |
|---|---|
| 0 | 10 |
| 1 | 11 |
| 2 | 12 |
| 3 | 15 |
| 4 | 16 |
| 6 | 12 |

2. The method of claim 1, wherein the uplink-downlink configuration of the primary cell indicates each subframe in a frame as a downlink subframe, an uplink subframe or a special subframe.

3. The method of claim 1, wherein the frame used by the secondary cell includes 10 consecutive downlink subframes.

4. The method of claim 1, wherein the uplink-downlink configuration of the primary cell is one of uplink-downlink configurations in a below table:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

5. A user equipment (UE) for performing hybrid automatic repeat request (HARQ) process, the UE comprising:
a transceiver that transmits and receives a radio signal; and
a processor connected with the transceiver,
wherein the process is configured to:
receive data in a first subframe of a secondary cell, and
transmit acknowledgement/negative-acknowledgement (ACK/NACK) information for the data in a second subframe of a primary cell,
wherein the primary cell uses a frame comprising at least one downlink subframe and at least one uplink subframe according to an uplink-downlink configuration of the primary cell,
wherein the secondary cell uses a frame comprising consecutive downlink subframes,
wherein a maximum number of HARQ processes for the secondary cell is dependent on the uplink-downlink configuration of the primary cell, and
wherein the maximum number of HARQ processes for the secondary cell is determined as shown in a below table:

| Uplink-downlink Configuration of the primary cell | Maximum number of HARQ processes for the secondary cell |
|---|---|
| 0 | 10 |
| 1 | 11 |
| 2 | 12 |
| 3 | 15 |
| 4 | 16 |
| 6 | 12 |

6. The UE of claim 5, wherein the uplink-downlink configuration of the primary cell indicates each subframe in a frame as a downlink subframe, an uplink subframe or a special subframe.

7. The UE of claim 5, wherein the frame used by the secondary cell includes 10 consecutive downlink subframes.

8. The UE of claim 5, wherein the uplink-downlink configuration of the primary cell is one of uplink-downlink configurations in a below table:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

* * * * *